United States Patent [19]
Laser

[11] Patent Number: 5,591,955
[45] Date of Patent: Jan. 7, 1997

[54] PORTABLE DATA FILE READERS

[76] Inventor: Vadim Laser, 9876 Zig Zag, Cincinnati, Ohio 45242

[21] Appl. No.: 340,285

[22] Filed: Nov. 16, 1994

Related U.S. Application Data

[63] Continuation-in-part of Ser. No. 332,560, Oct. 31, 1994, abandoned, which is a continuation-in-part of Ser. No. 298,345, Aug. 29, 1994, abandoned, which is a continuation-in-part of Ser. No. 241,866, May 11, 1994, abandoned, which is a continuation-in-part of Ser. No. 170,120, Dec. 17, 1993, abandoned, which is a continuation-in-part of Ser. No. 67,384, May 25, 1993, abandoned, which is a continuation-in-part of Ser. No. 60,404, May 11, 1993, abandoned.

[51] Int. Cl.$^6$ ................................................ G06K 7/10
[52] U.S. Cl. ...................... 235/472; 235/462; 348/218
[58] Field of Search ................ 348/218; 235/462–472

[56] References Cited

U.S. PATENT DOCUMENTS

| | | |
|---|---|---|
| 4,101,072 | 7/1978 | Weaver et al. . |
| 4,136,821 | 1/1979 | Sugiura ................................ 235/462 |
| 4,323,925 | 4/1982 | Abell et al. . |
| 4,335,302 | 6/1982 | Robillard . |
| 4,389,103 | 6/1983 | Kramer . |
| 4,516,017 | 5/1985 | Hari et al. . |
| 4,660,096 | 4/1987 | Arlan et al. . |
| 4,874,933 | 10/1989 | Sanner ................................ 235/454 |
| 4,877,949 | 10/1989 | Danielson et al. ................. 235/454 |
| 5,016,109 | 5/1991 | Gaylord ................................ 348/218 |
| 5,130,520 | 7/1992 | Shepard et al. . |
| 5,159,455 | 10/1992 | Cox et al. . |
| 5,192,856 | 3/1993 | Schaham ............................... 235/462 |
| 5,210,398 | 5/1993 | Metlitsky . |
| 5,378,883 | 1/1995 | Batterman et al. ................. 235/472 |

FOREIGN PATENT DOCUMENTS

| | | |
|---|---|---|
| 85495 | 8/1983 | European Pat. Off. . |
| 384955 | 9/1990 | European Pat. Off. . |
| 385478 | 9/1990 | European Pat. Off. . |
| 67692 | 3/1988 | Japan .................................. 235/462 |
| 6-83999 | 3/1994 | Japan .................................. 235/462 |
| 6017 | 6/1989 | WIPO . |

*Primary Examiner*—John Shepperd
*Attorney, Agent, or Firm*—Dinsmore & Shohl

[57] ABSTRACT

The present invention utilizes photosensitive arrays for decoding optically readable portable data files. The invention accomplishes focusing, controlling image exposure, capturing data files, and processing information contained within optically readable portable data files.

41 Claims, 42 Drawing Sheets

Types of service frame:
- both beams are equal
- one beam is switched off
- one beam has more energy k-lines processed during "service frame"
m-distance between spots of pointing beams.

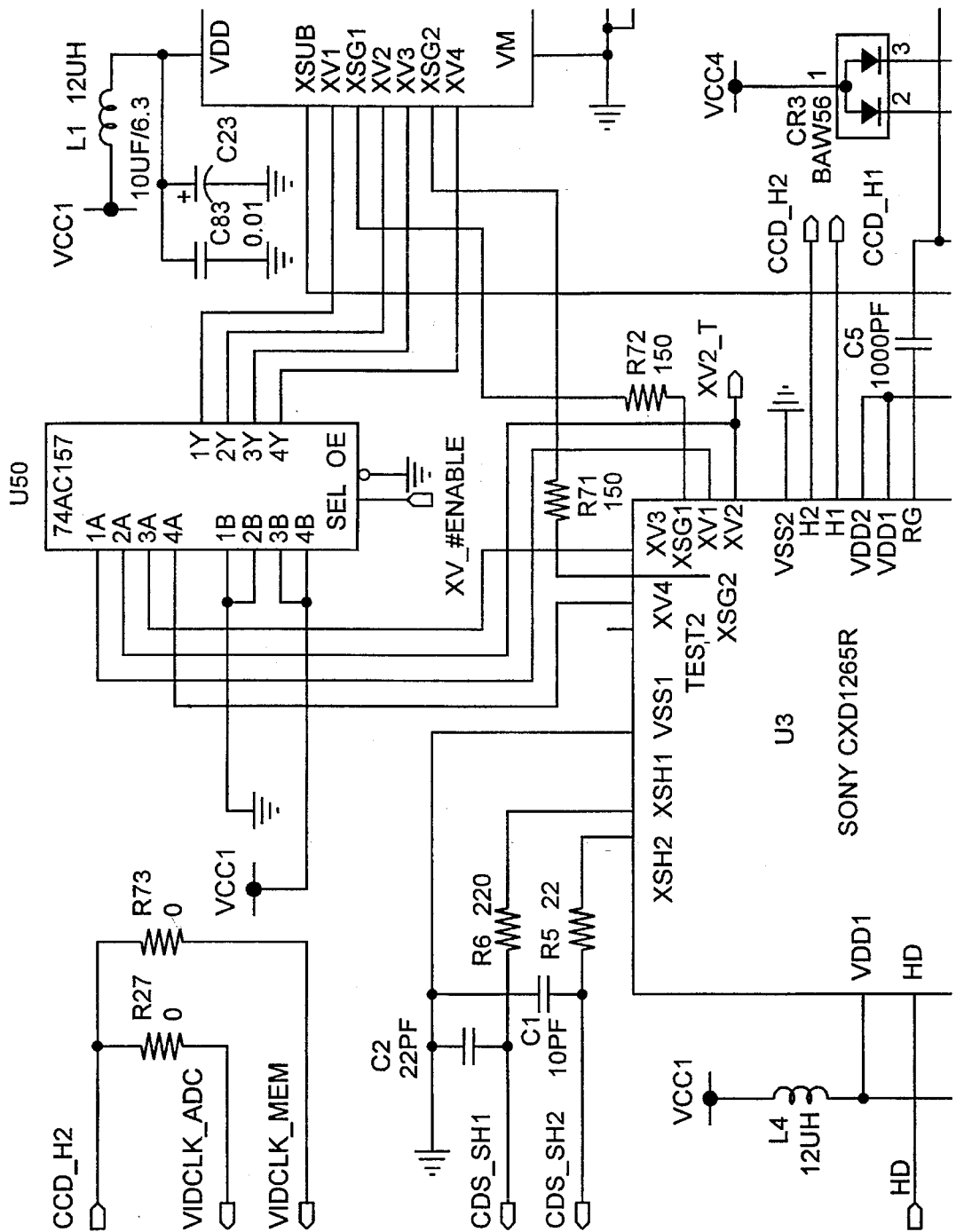
FIG. 9A1

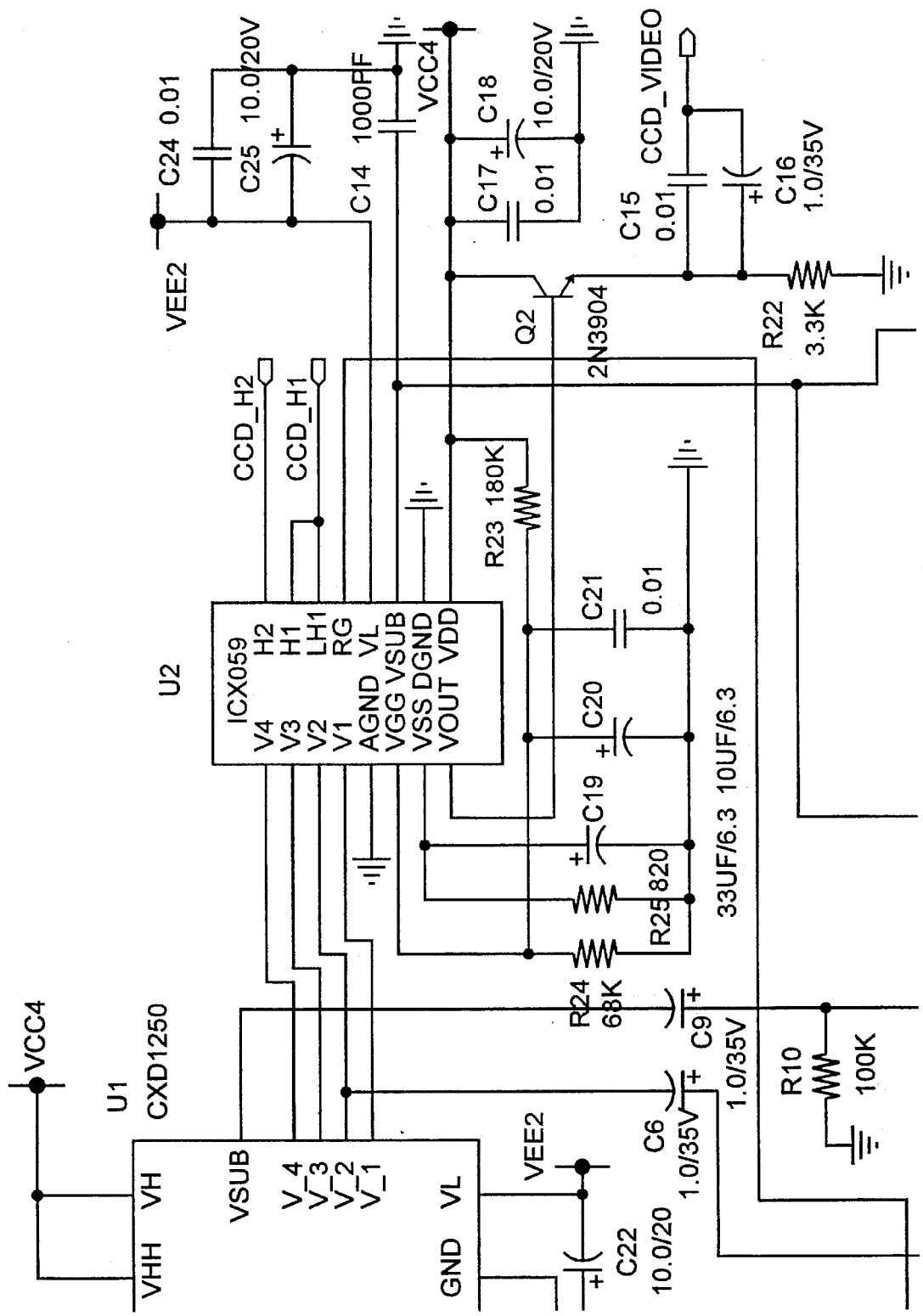
FIG. 9A2

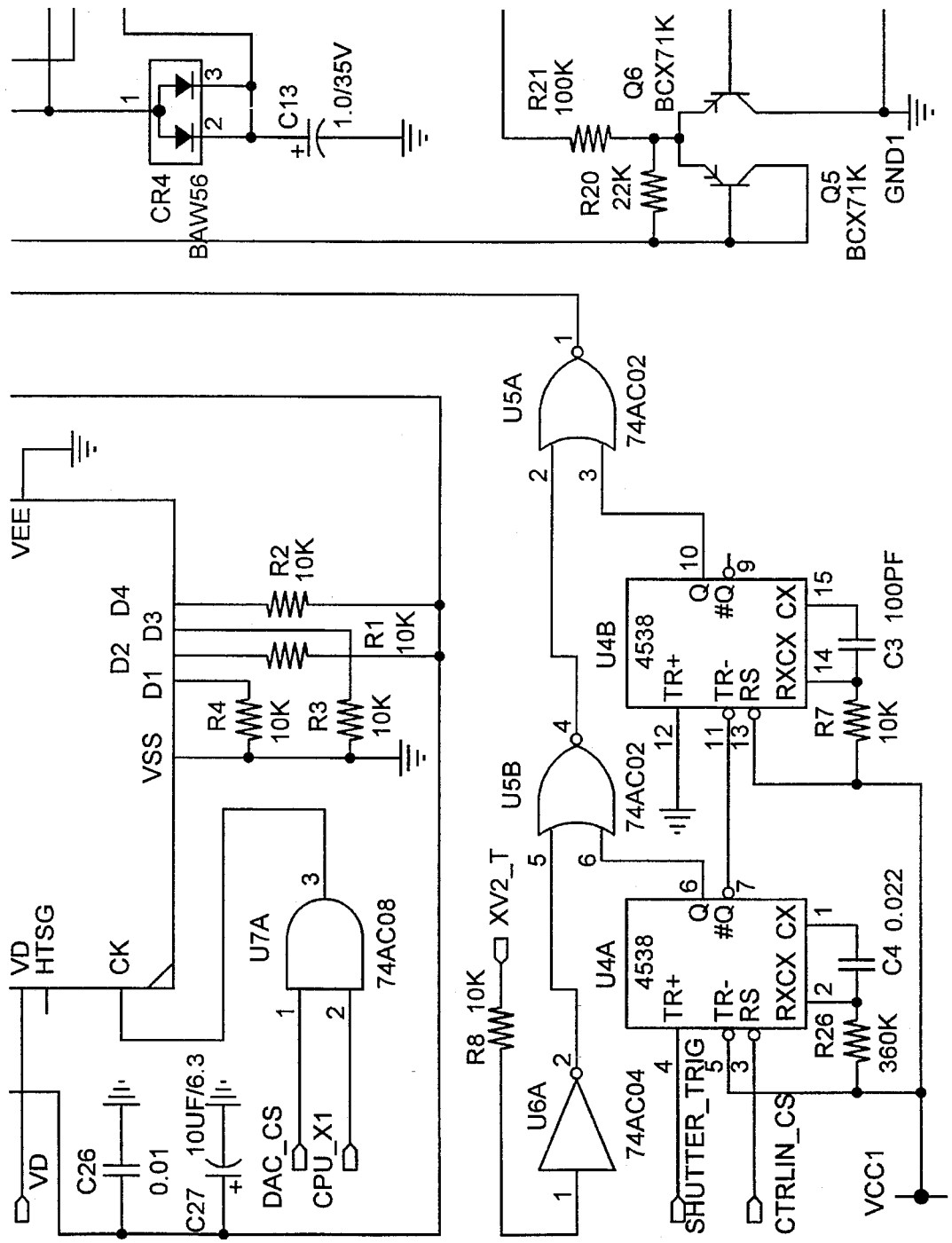
FIG. 9A3

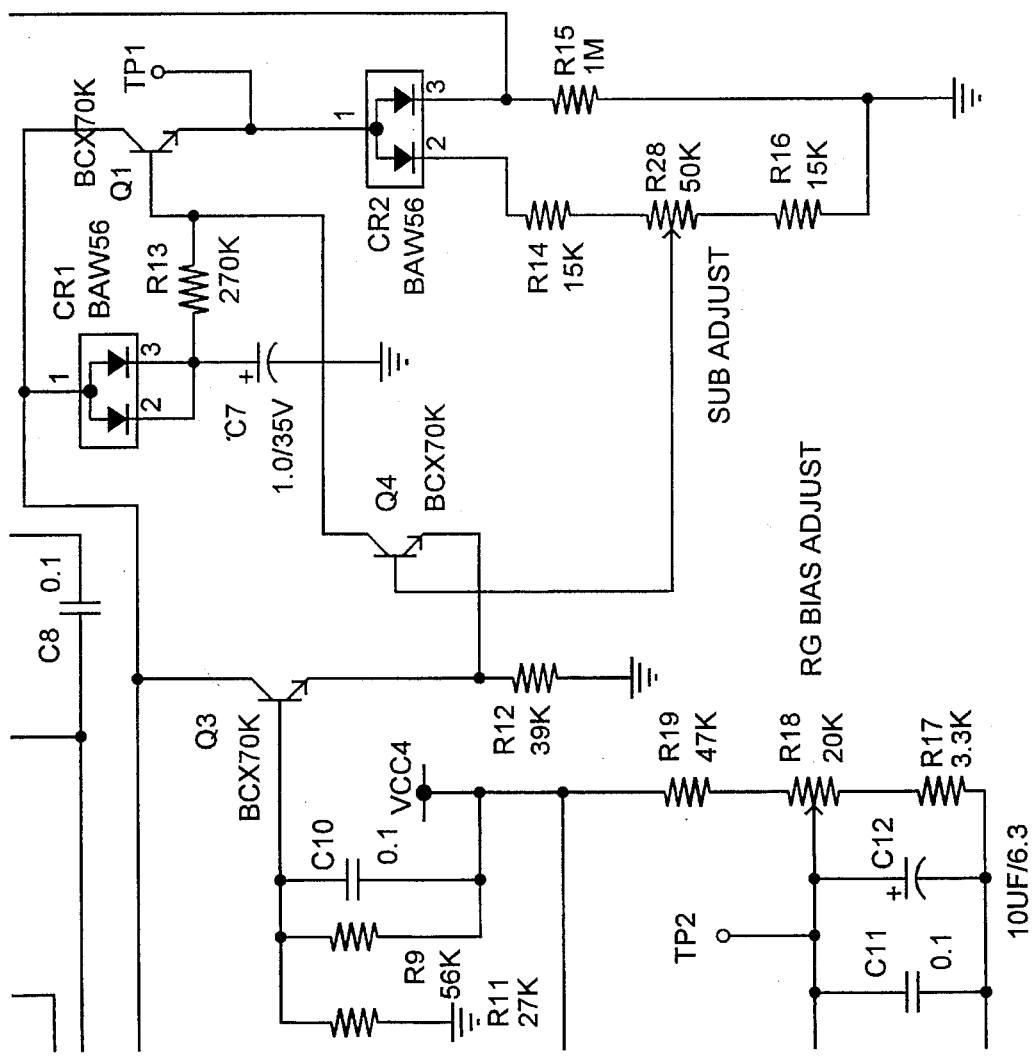
FIG. 9A4

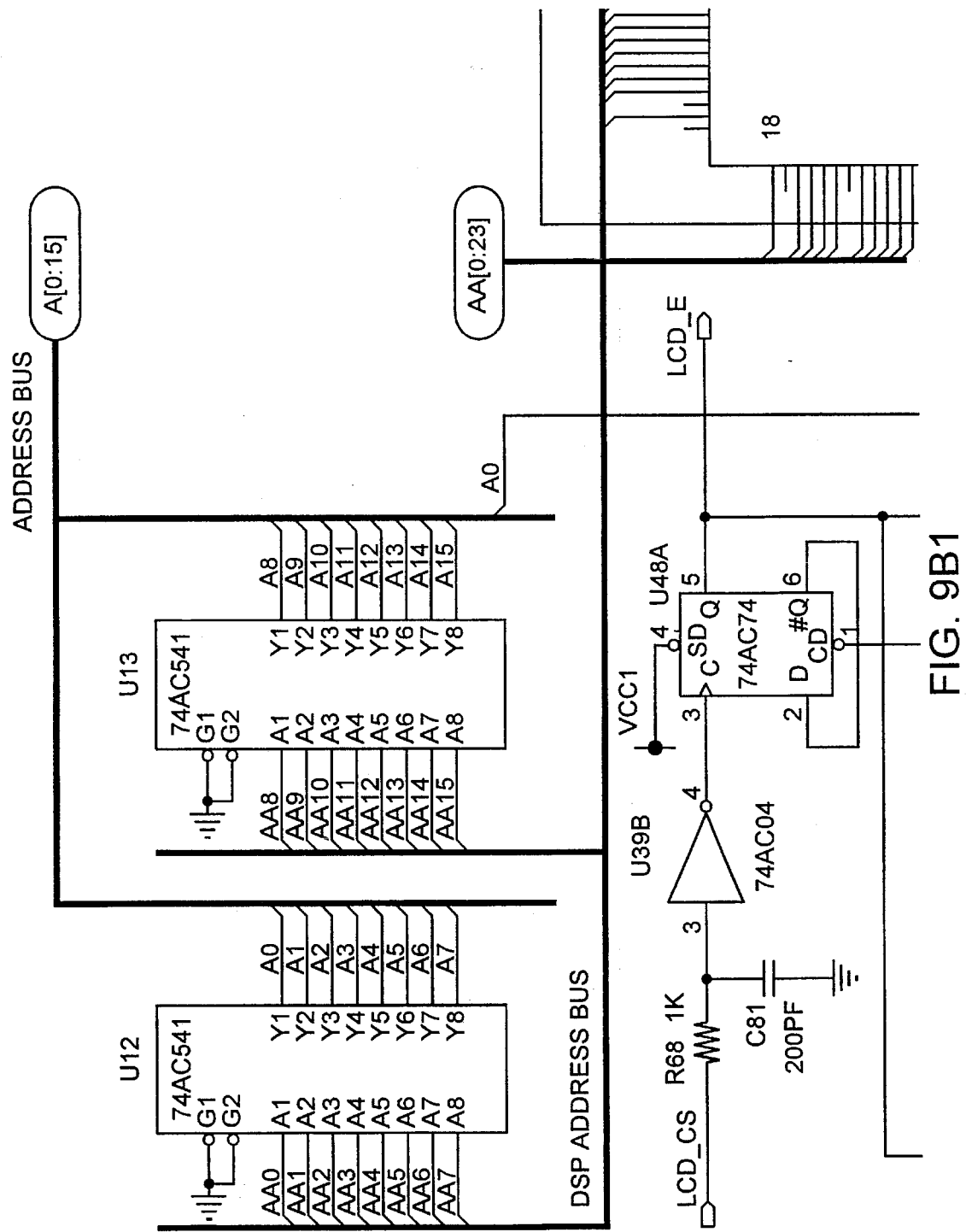
FIG. 9B1

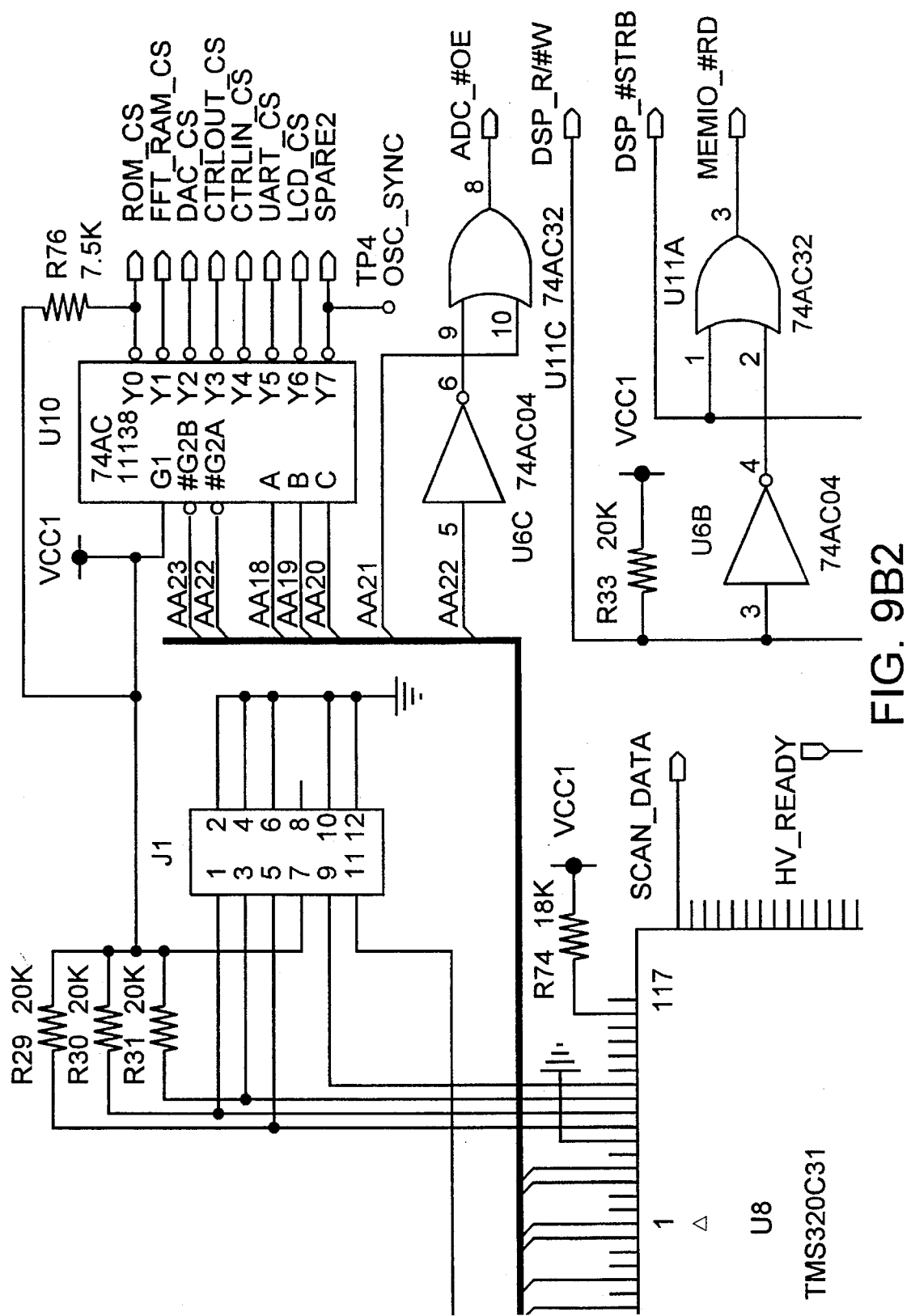
FIG. 9B2

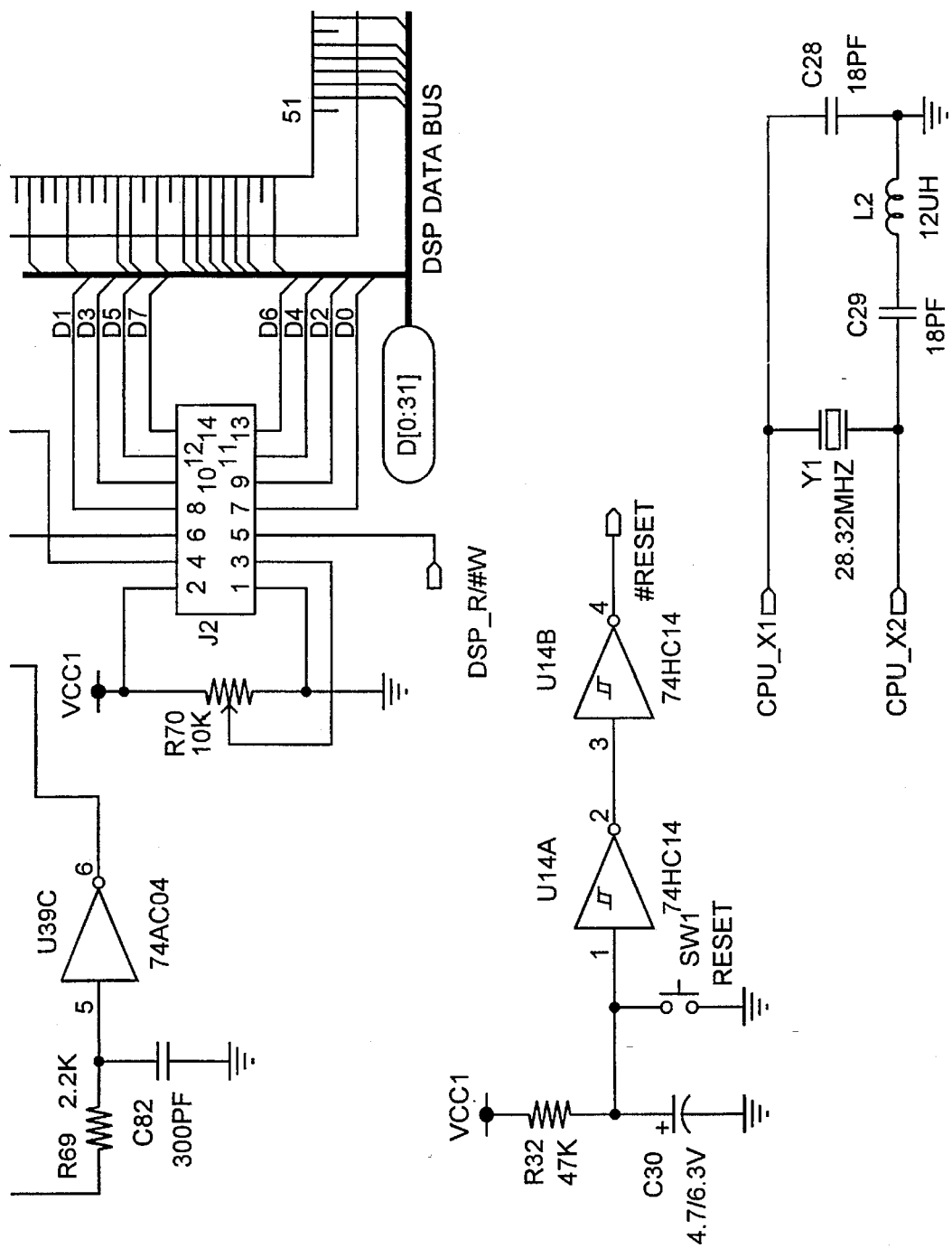
FIG. 9B3

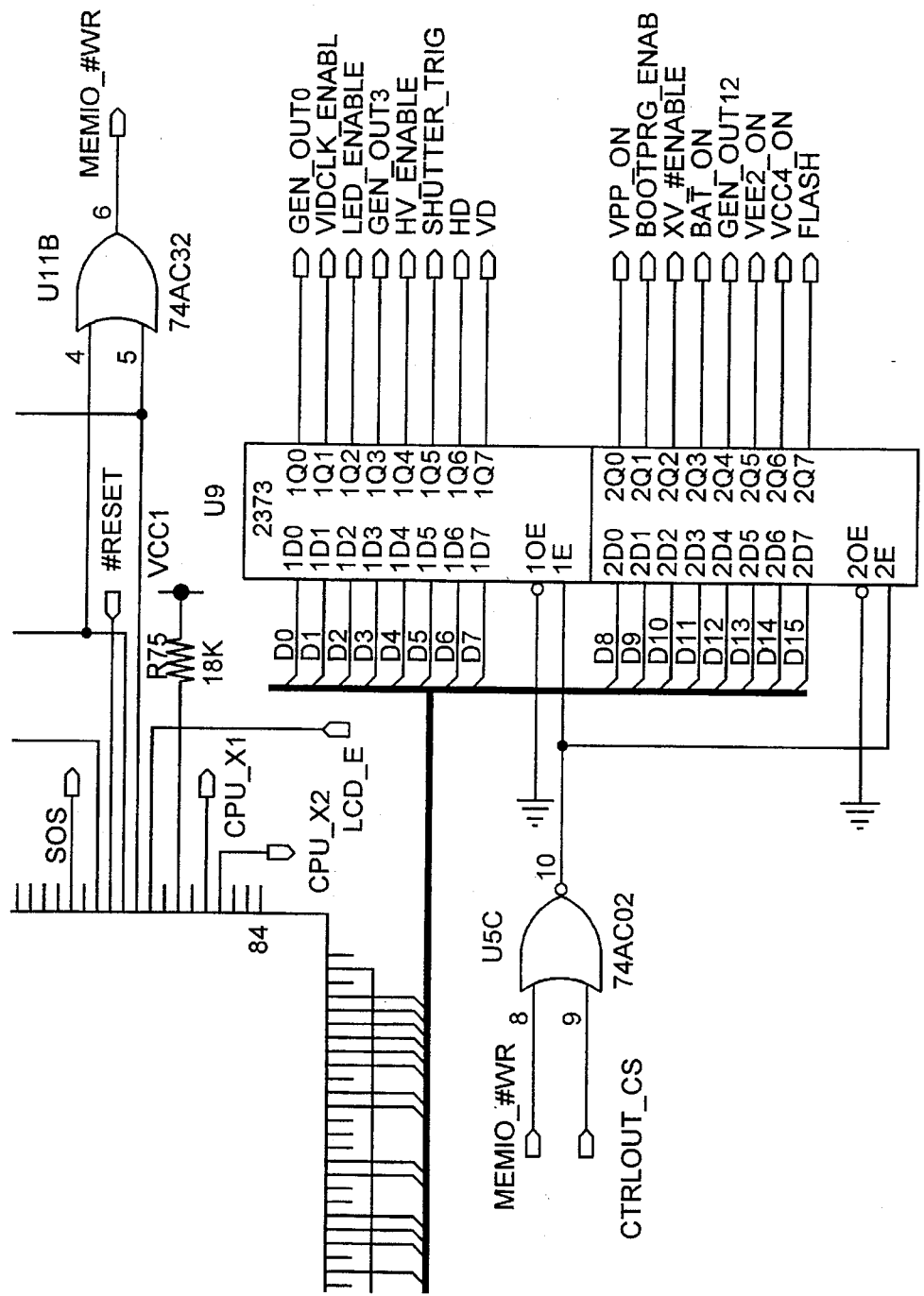
FIG. 9B4

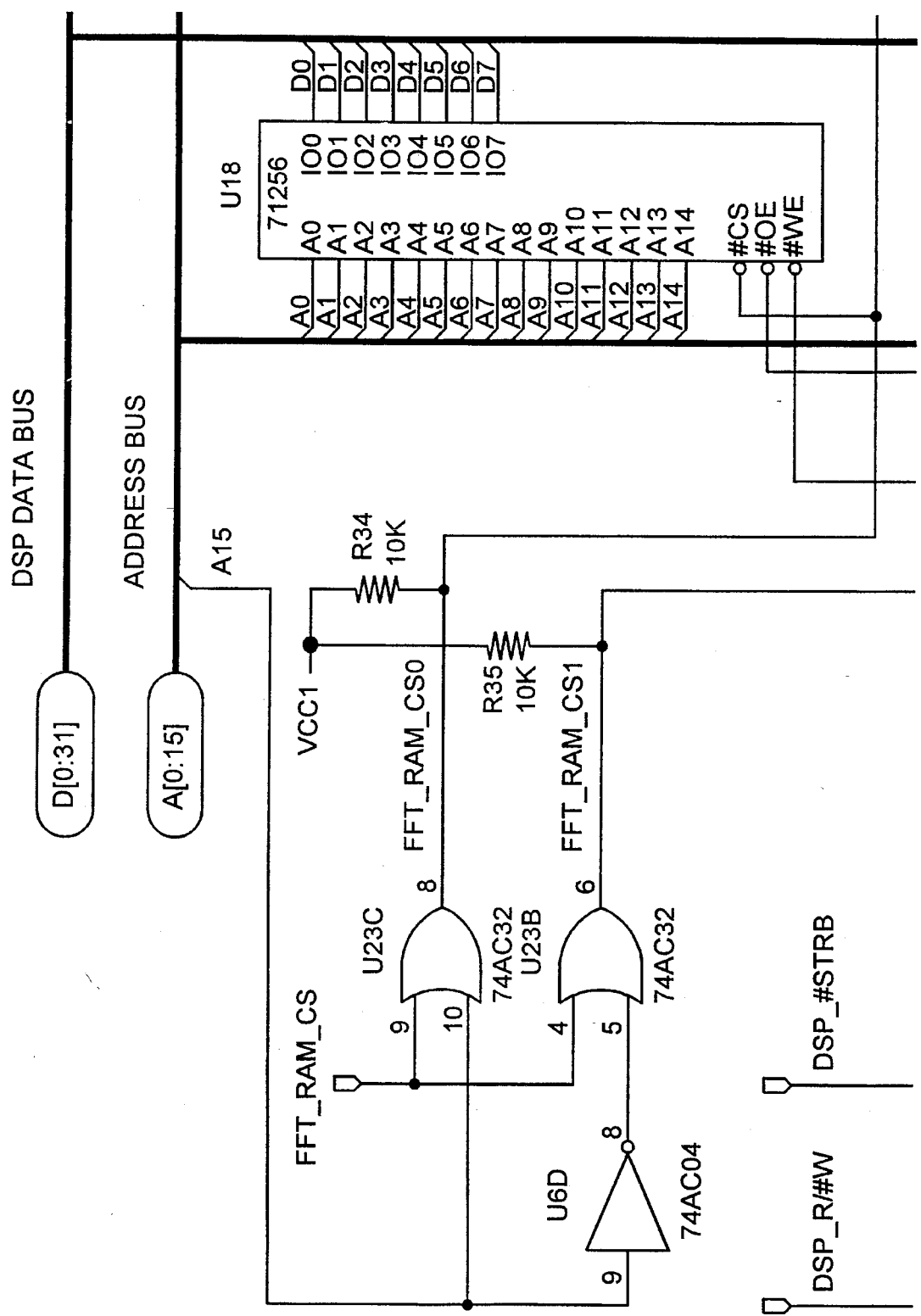
FIG. 9C1

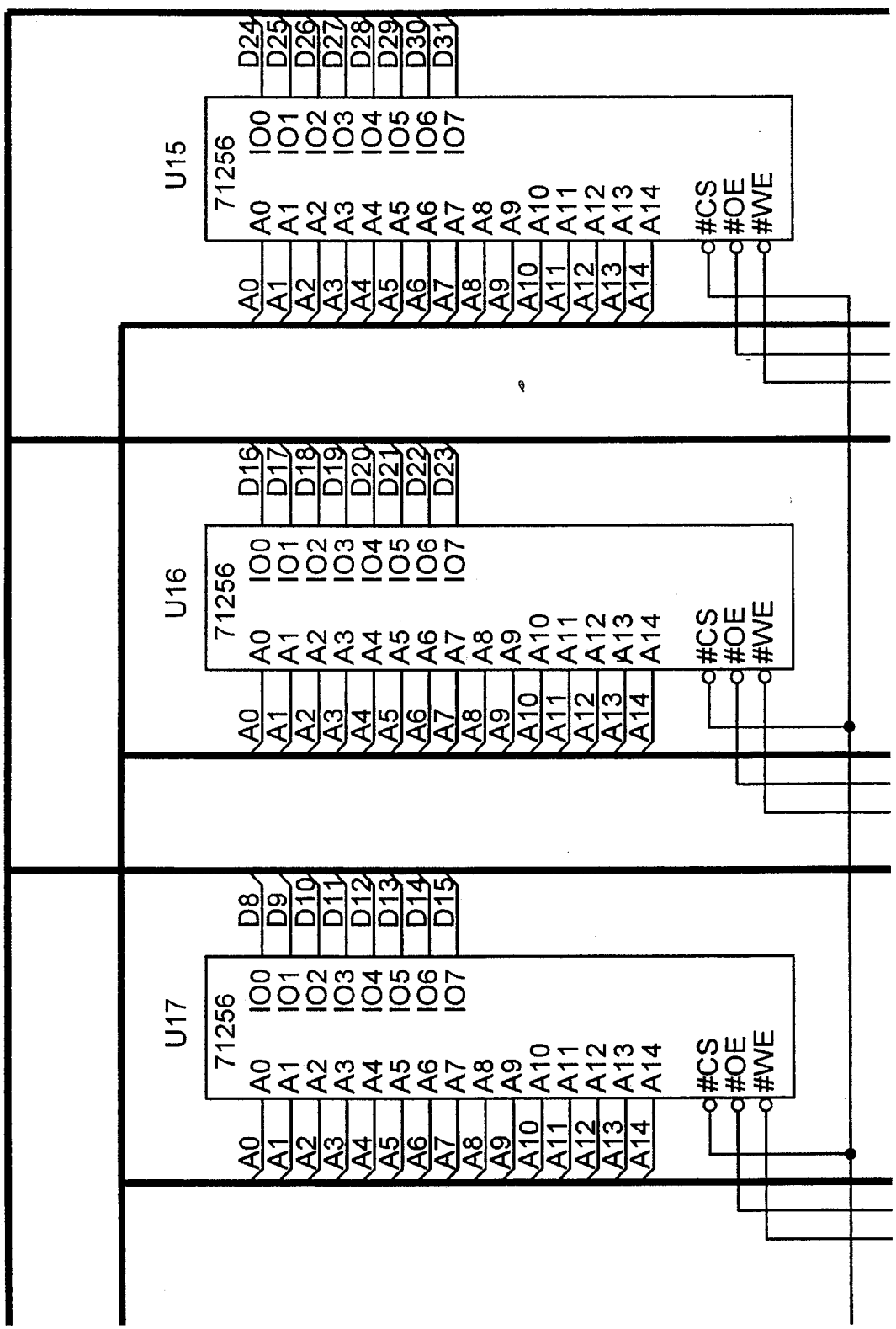
FIG. 9C2

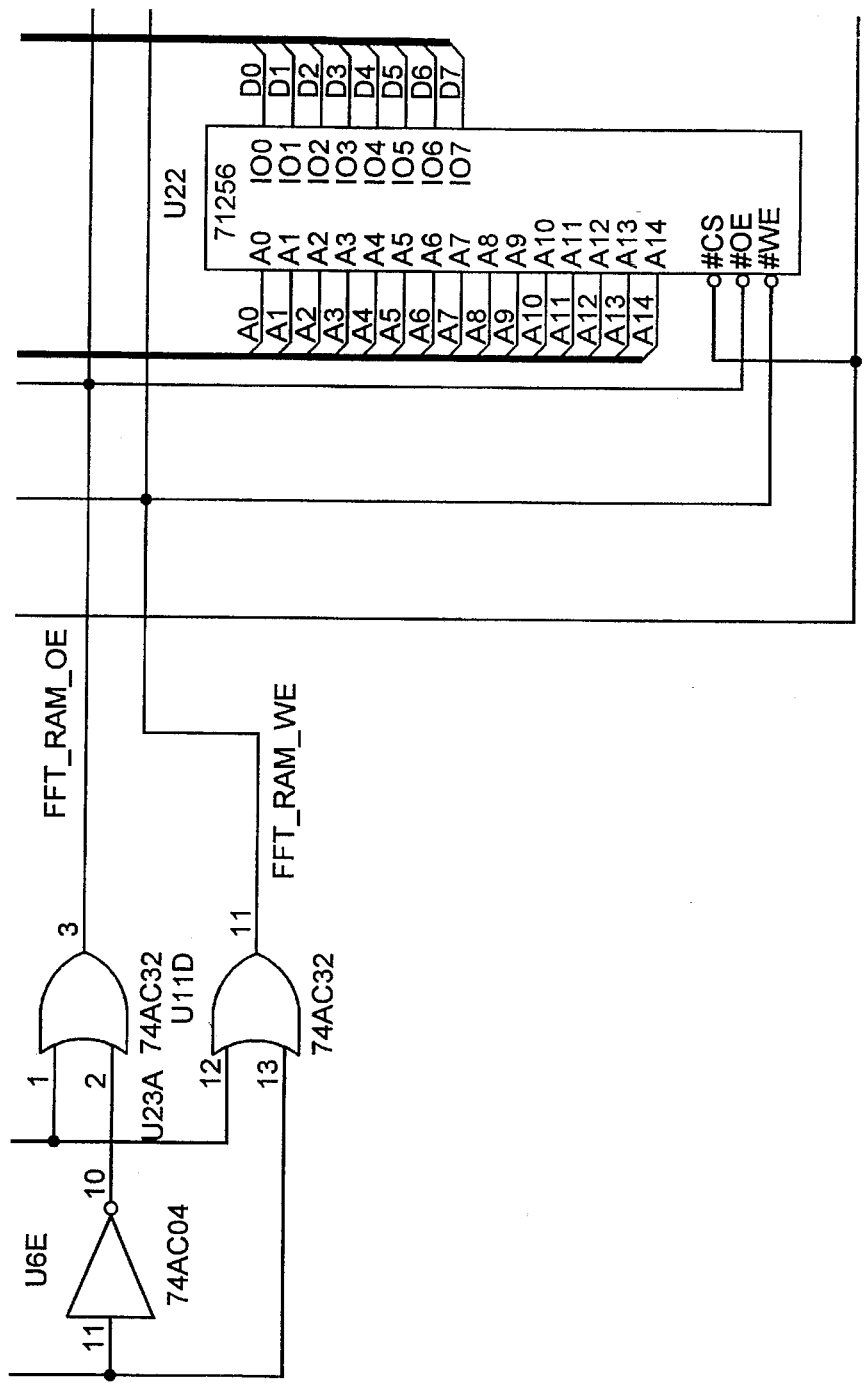
FIG. 9C3

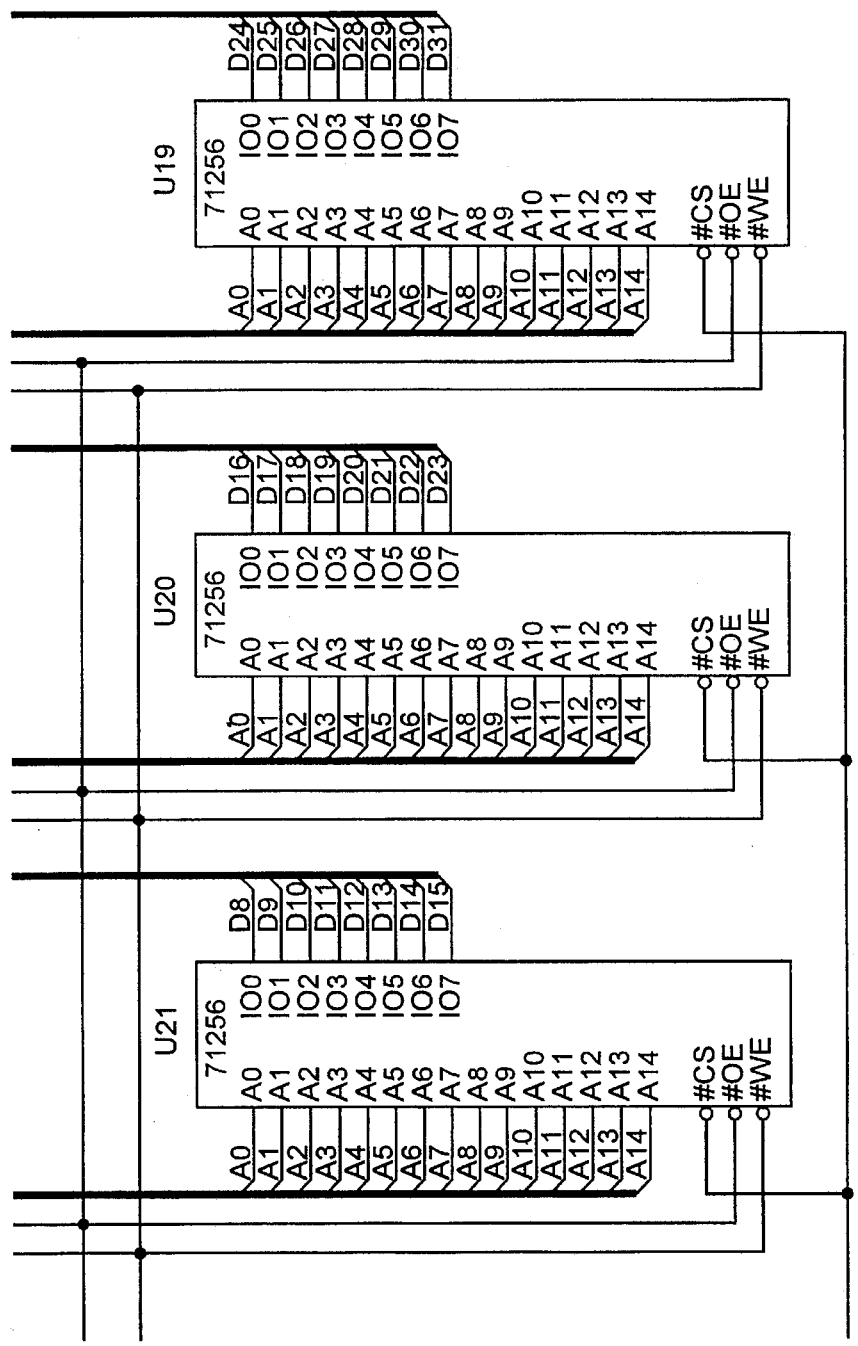
FIG. 9C4

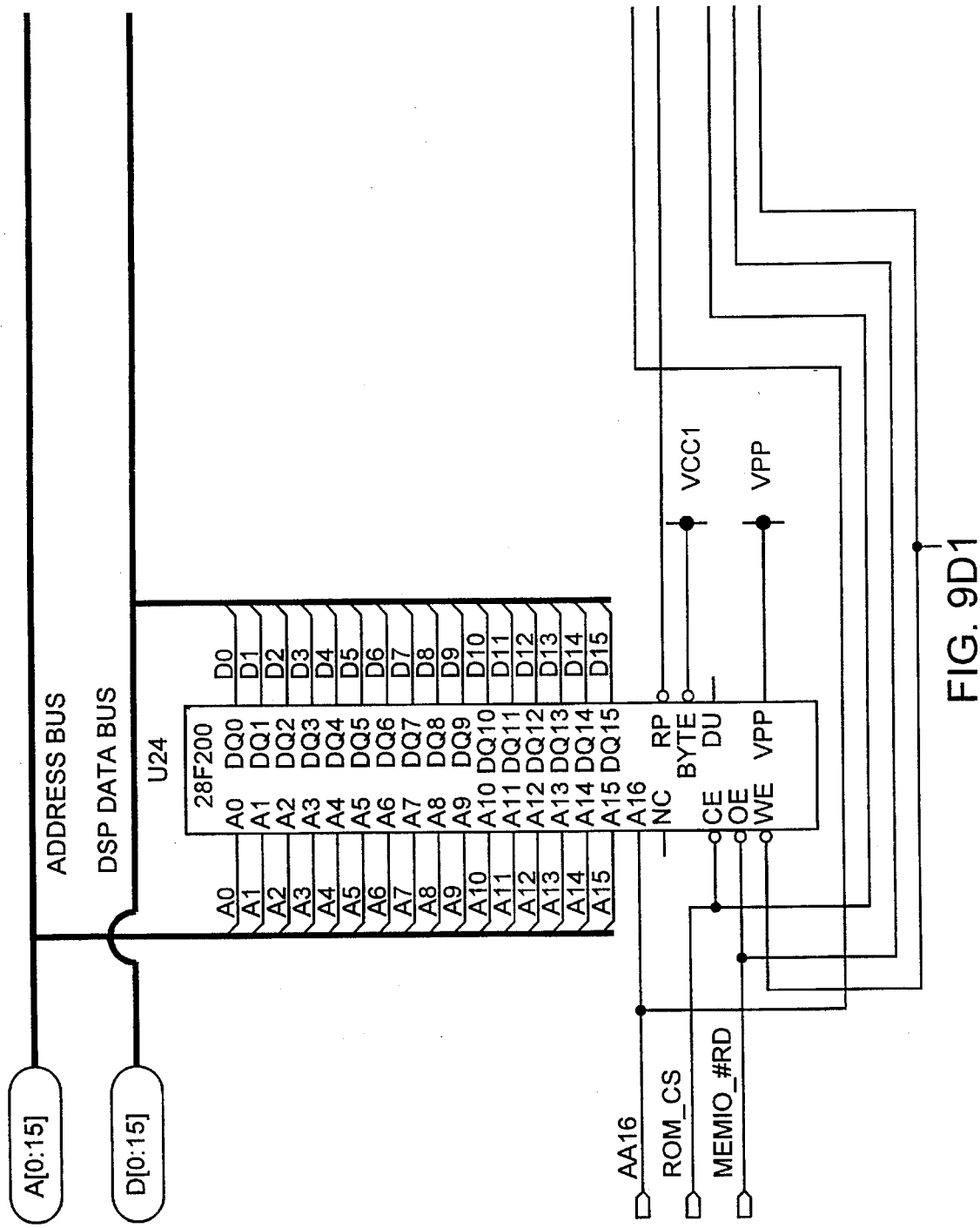

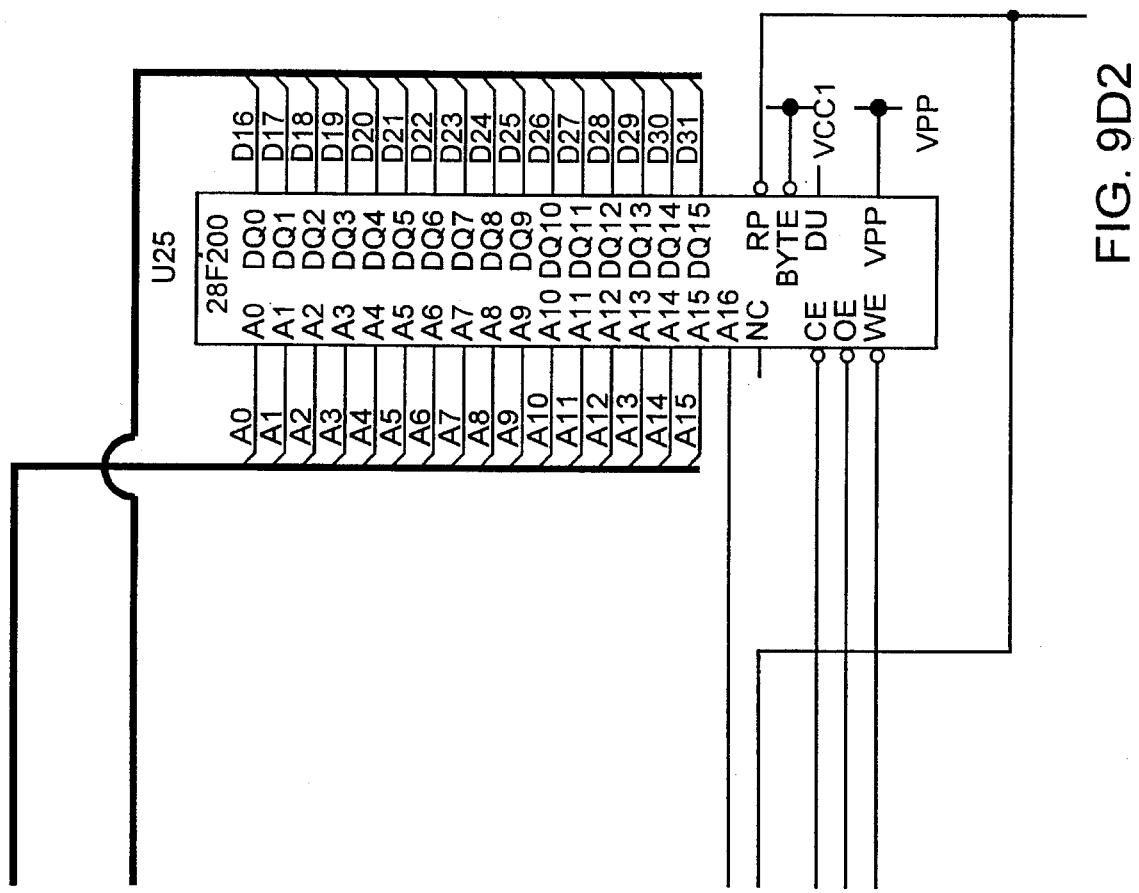
FIG. 9D2

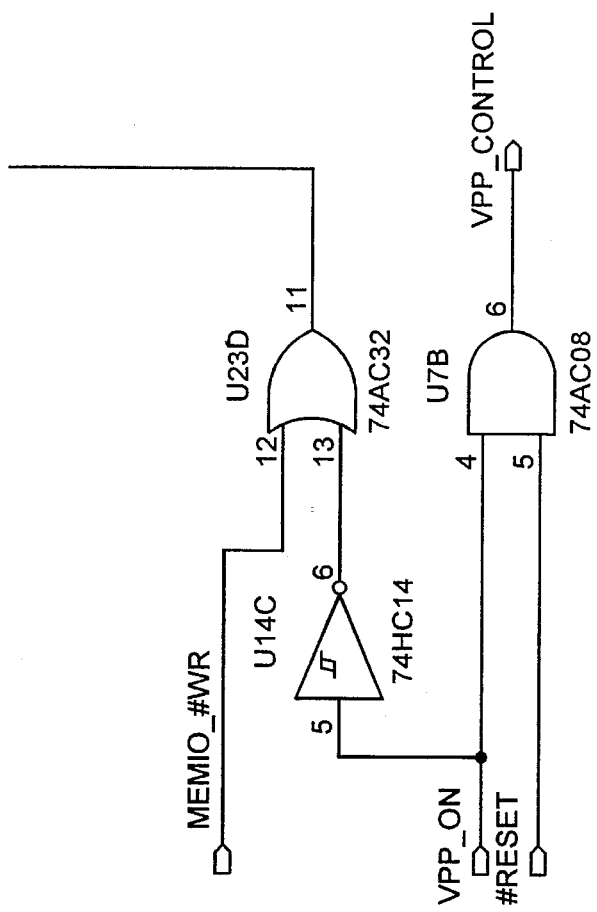
FIG. 9D3

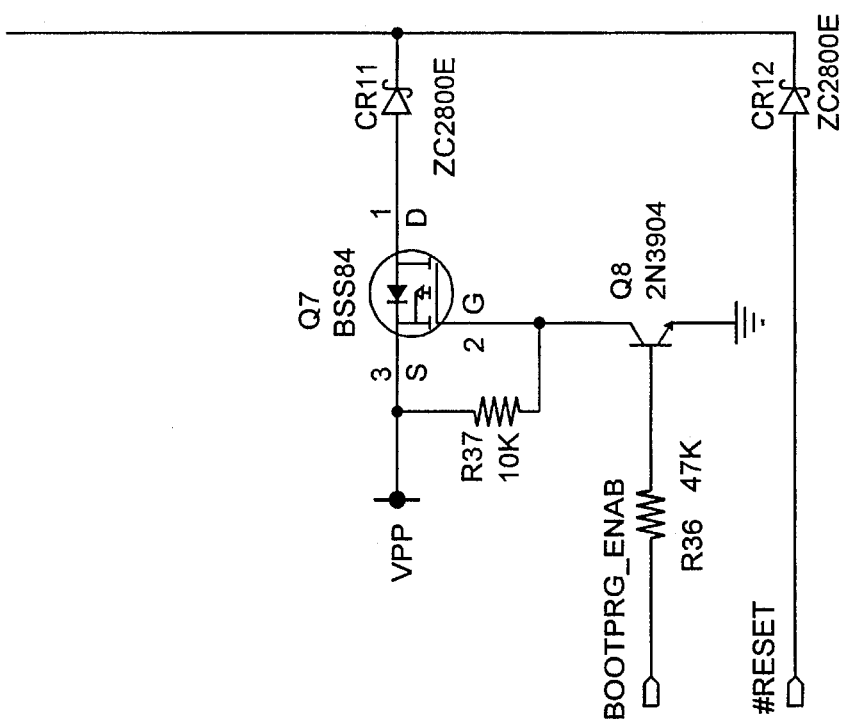
FIG. 9D4

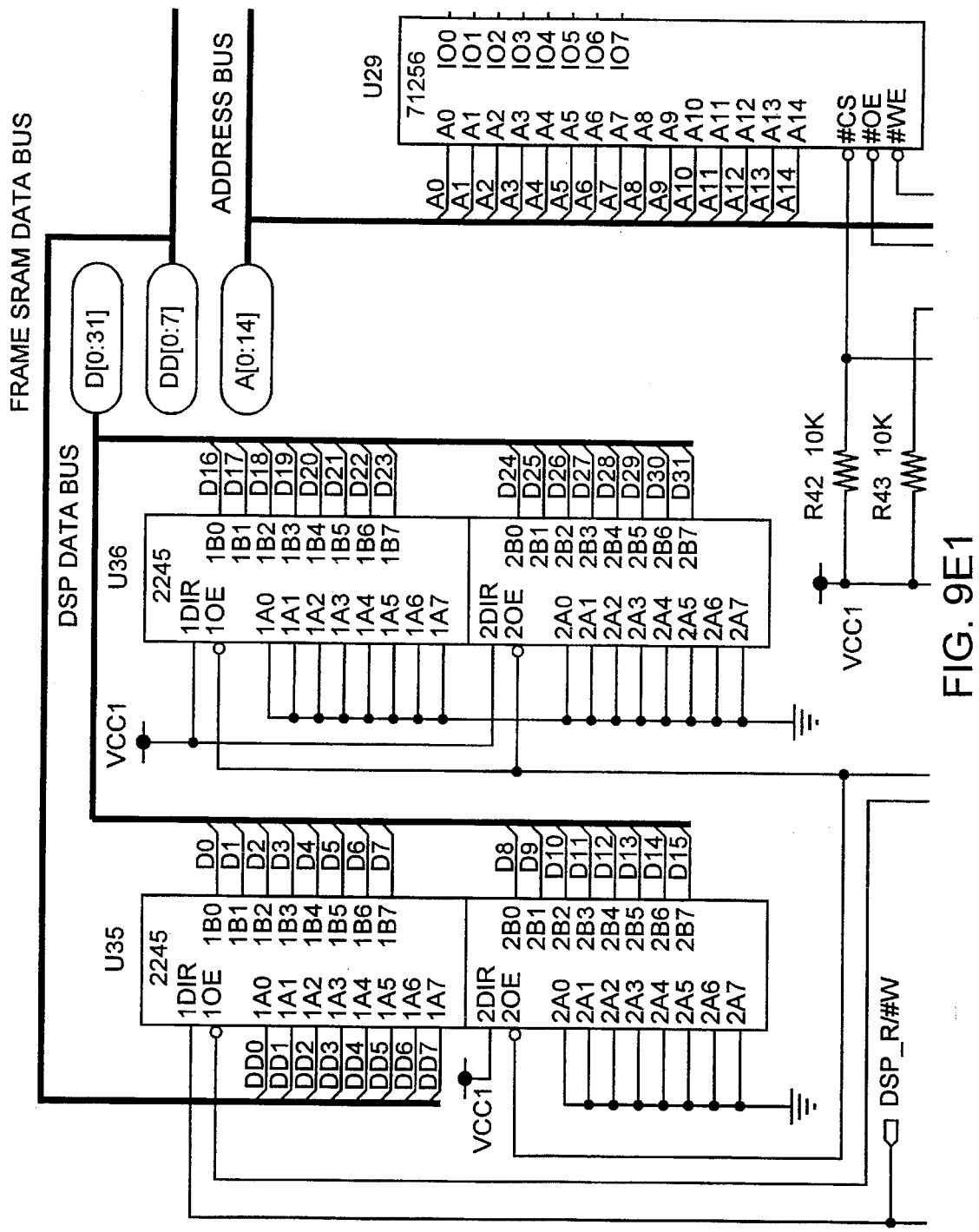
FIG. 9E1

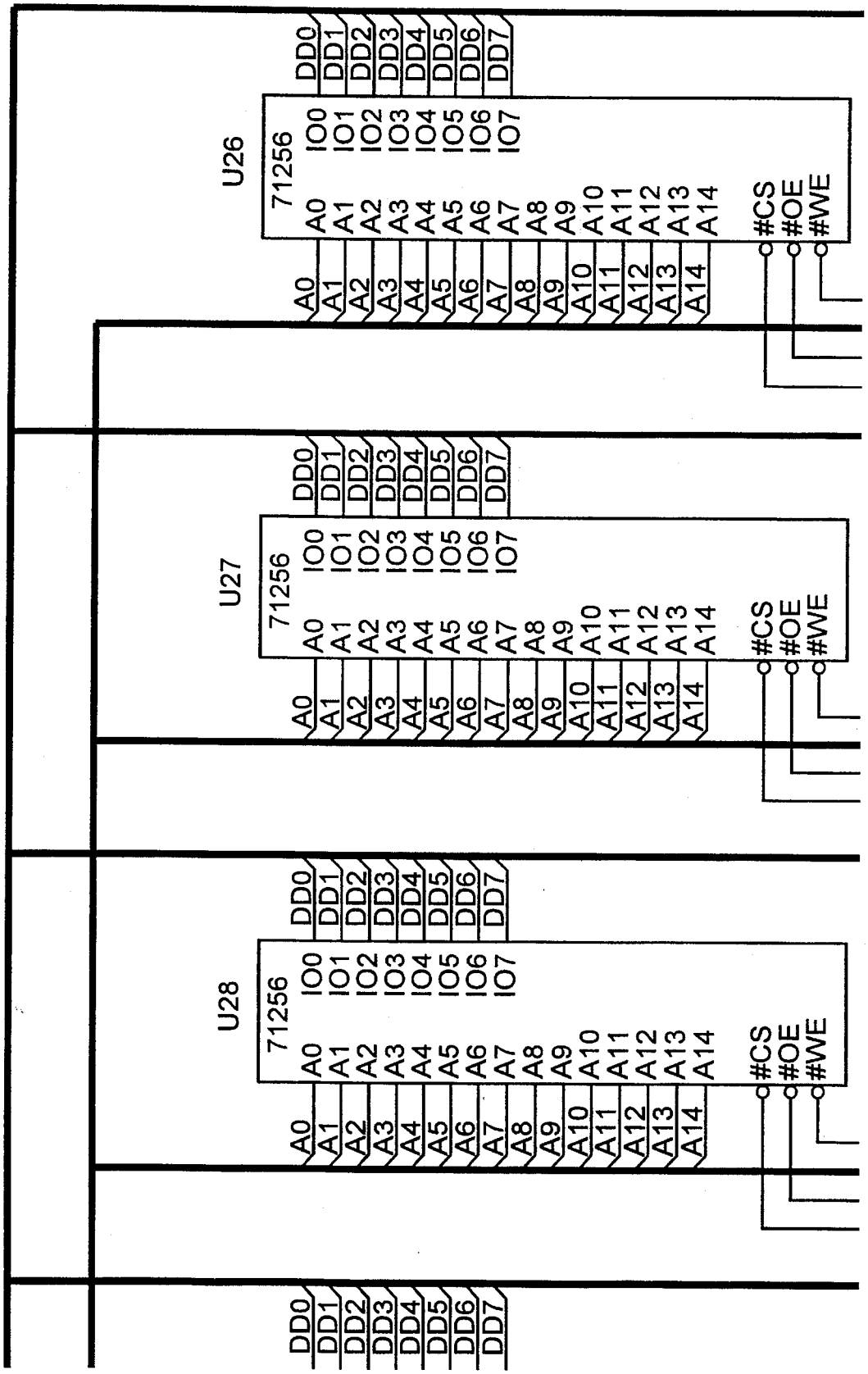
FIG. 9E2

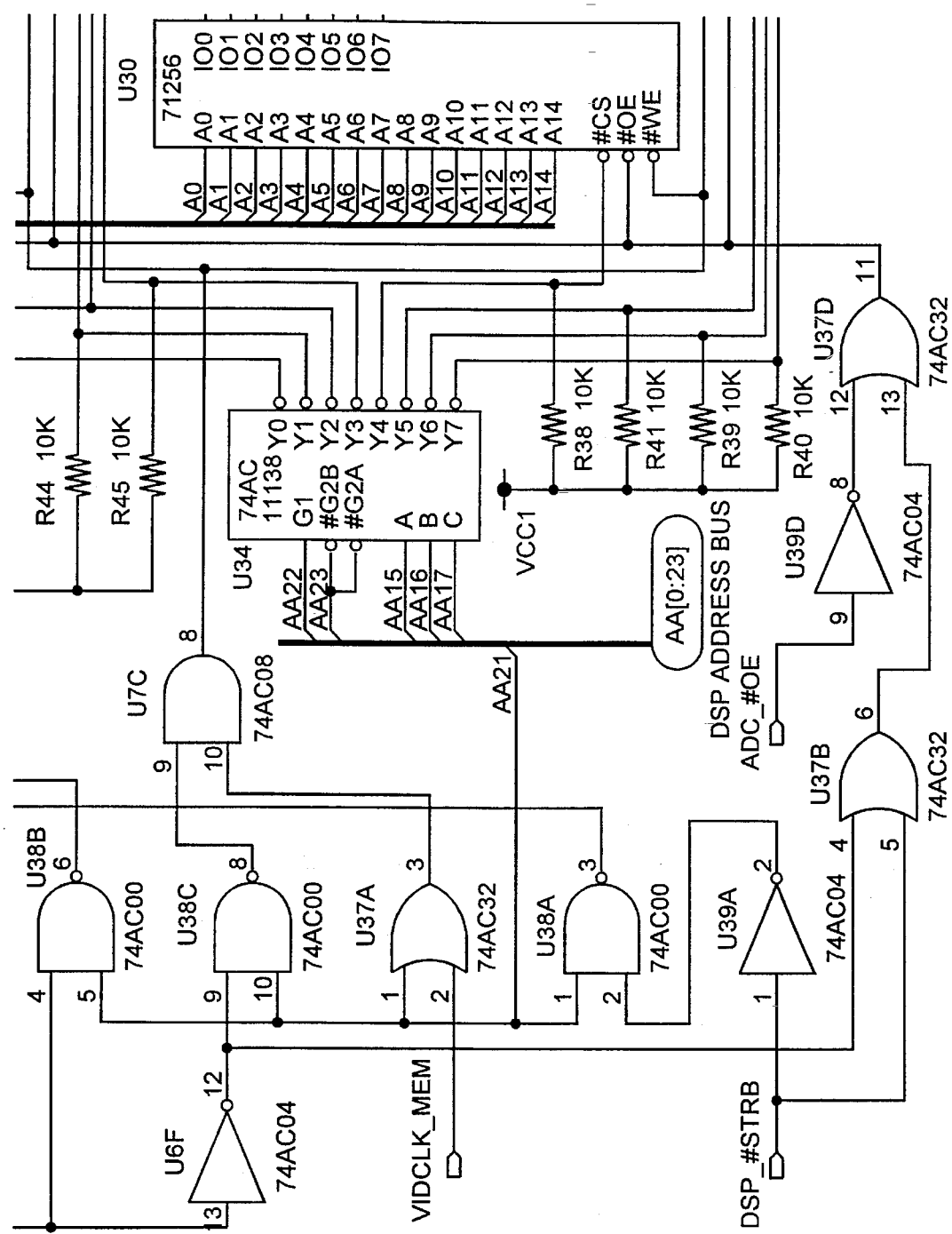
FIG. 9E3

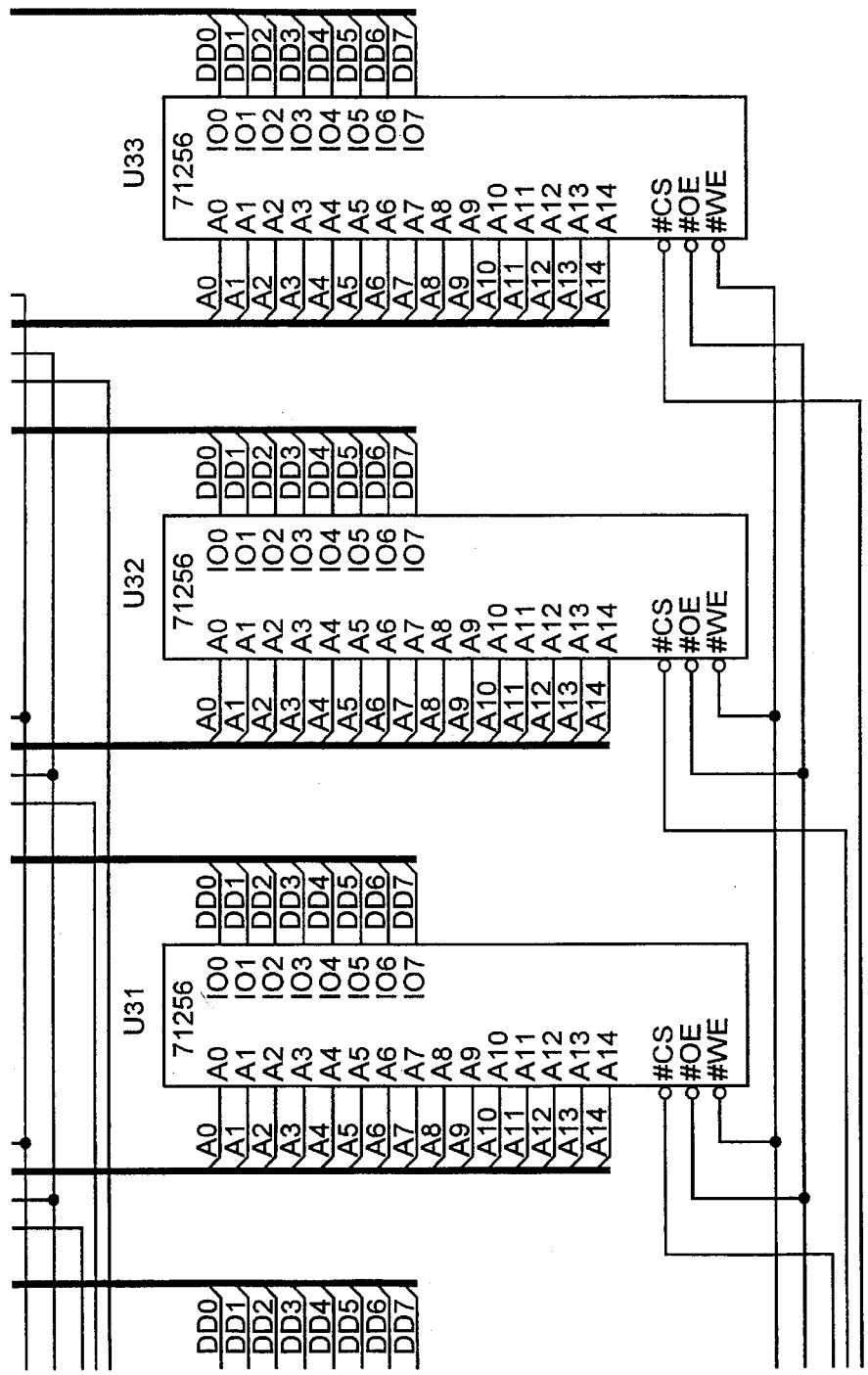
FIG. 9E4

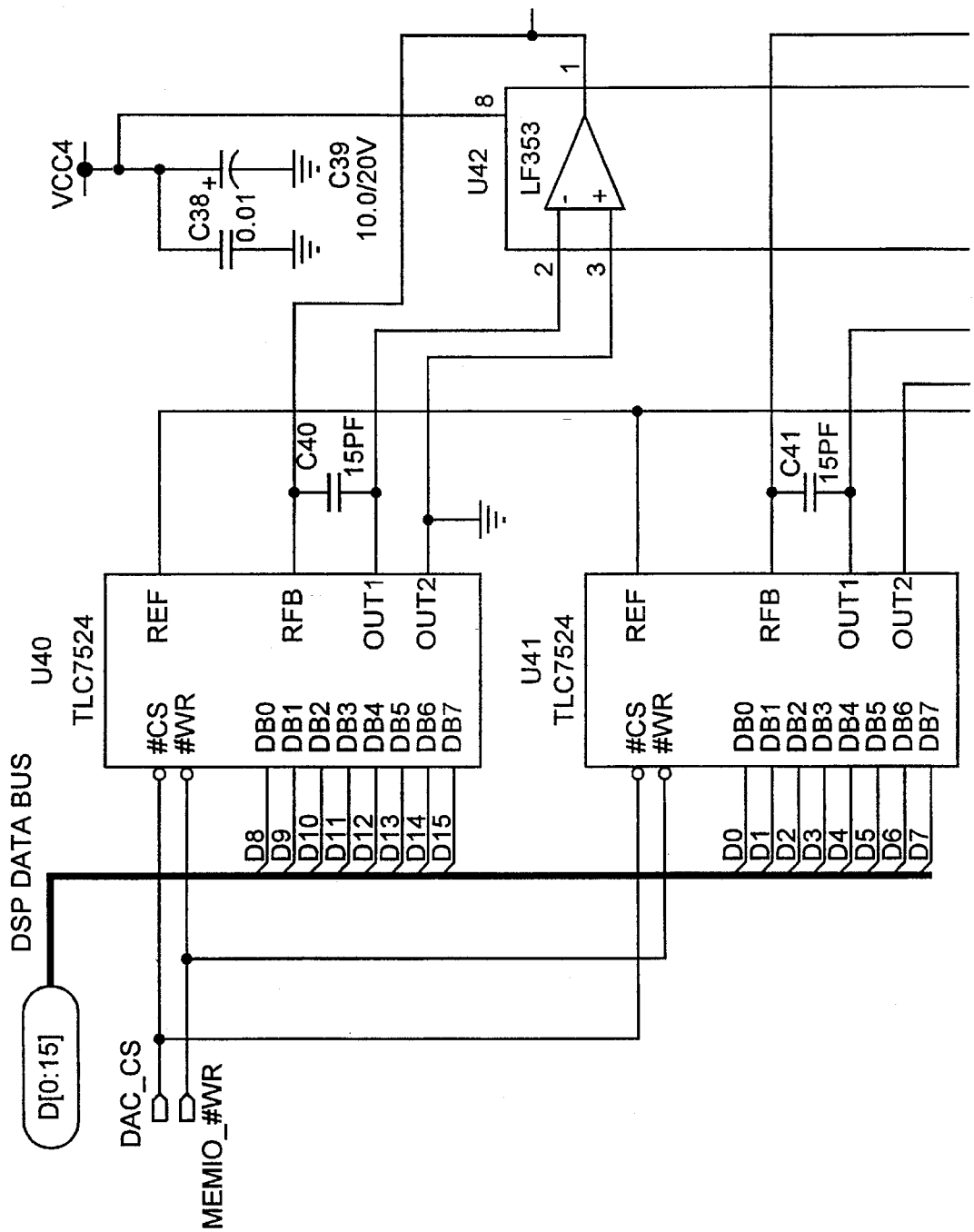
FIG. 9F1

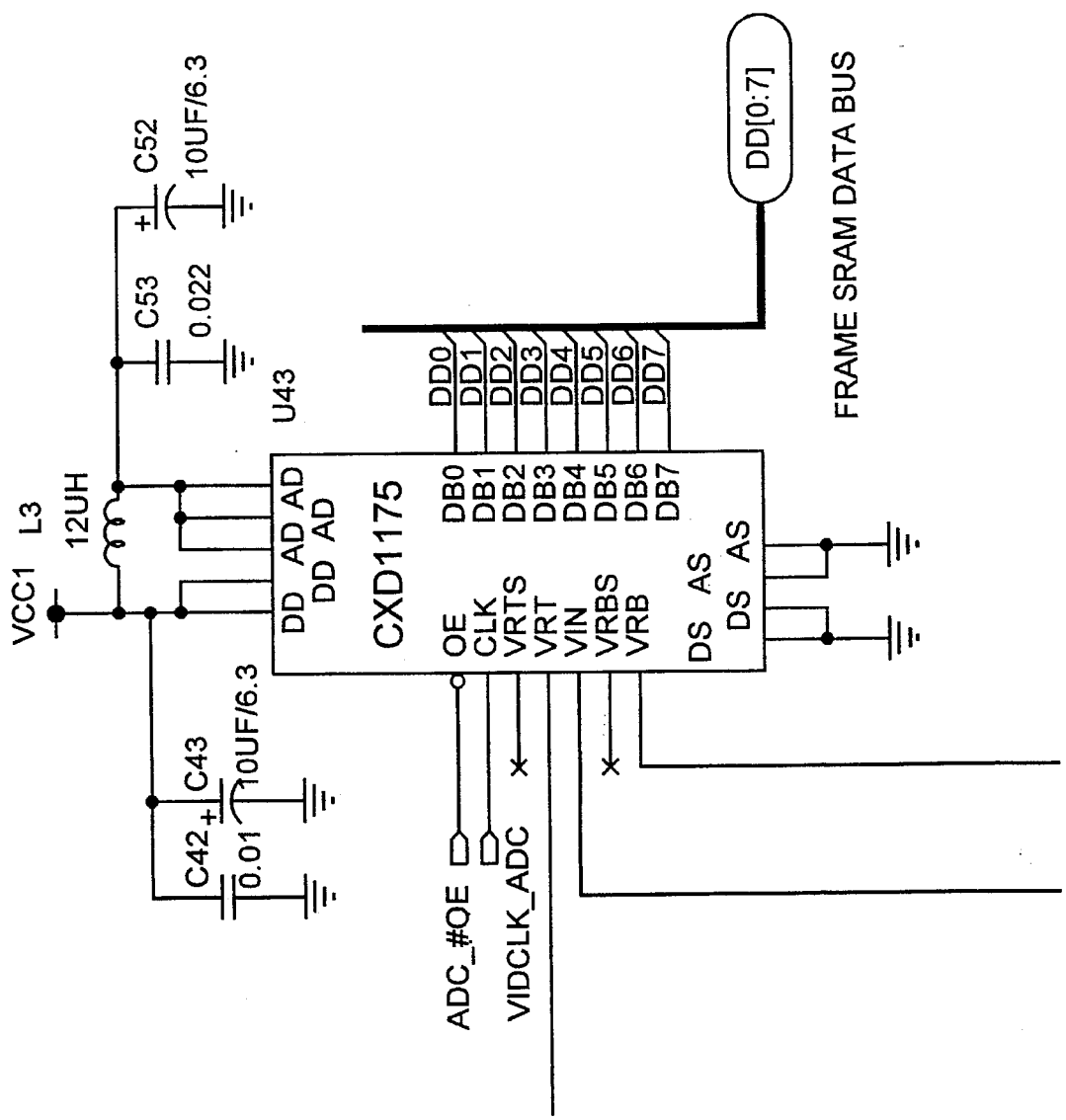
FIG. 9F2

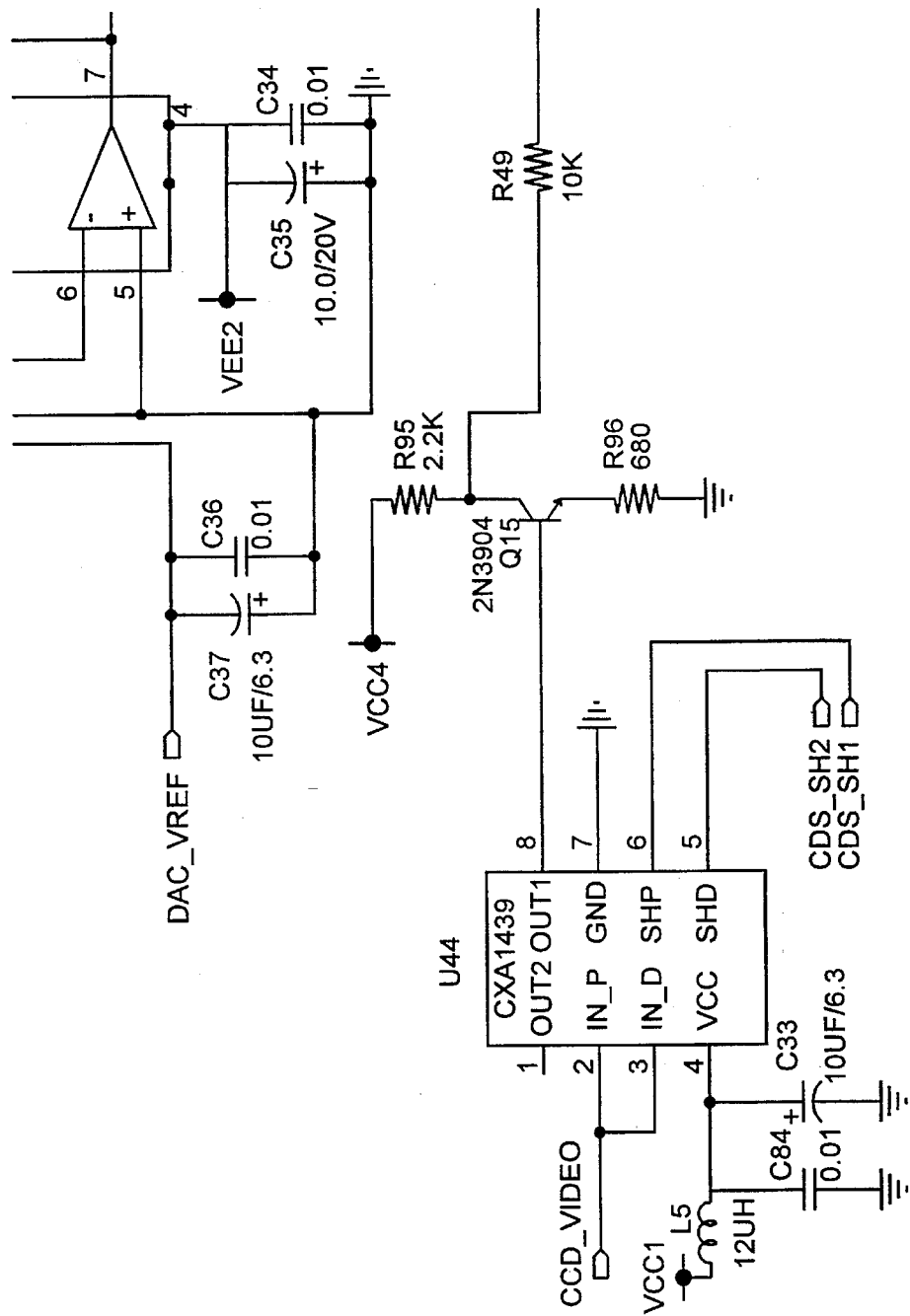
FIG. 9F3

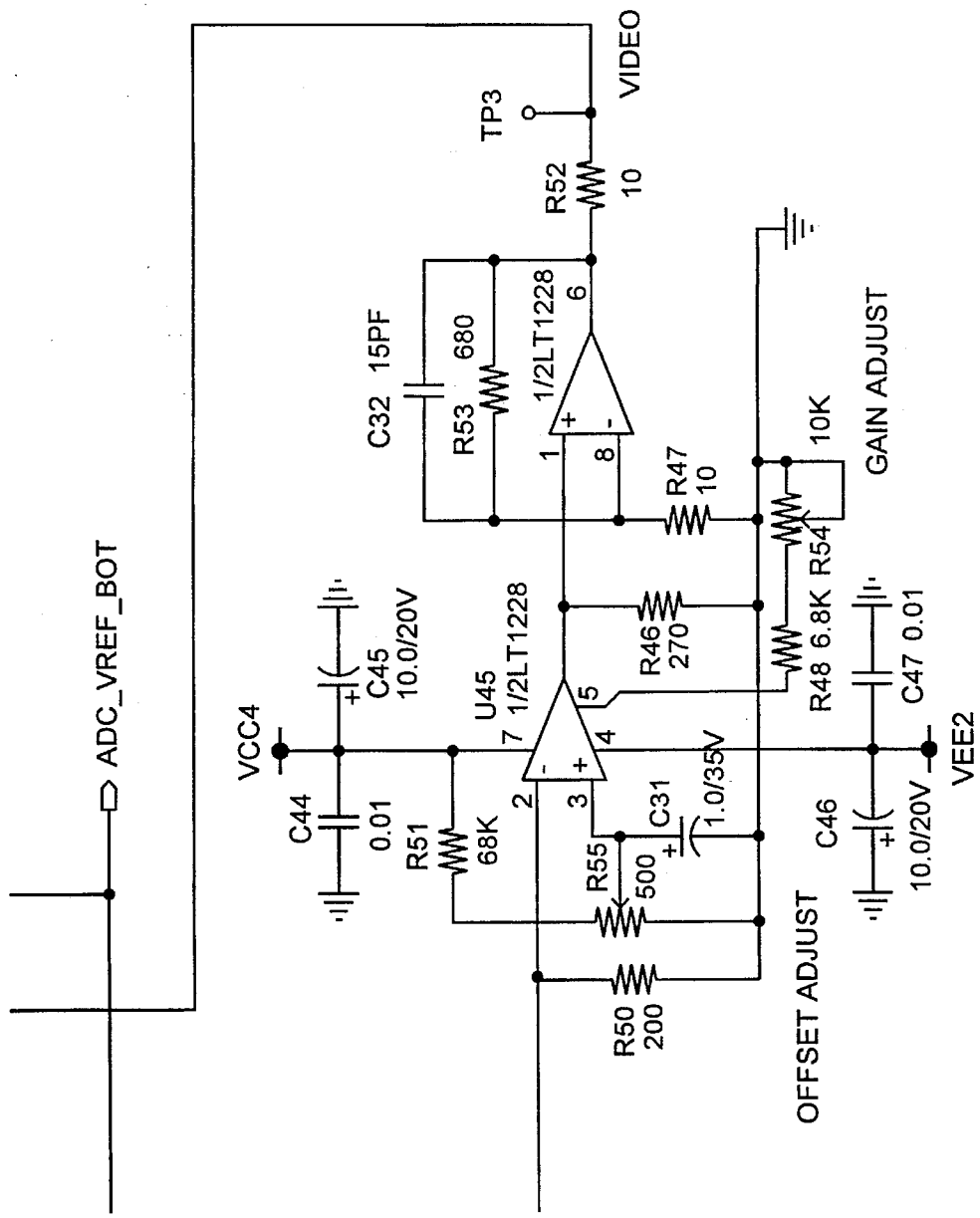
FIG. 9F4

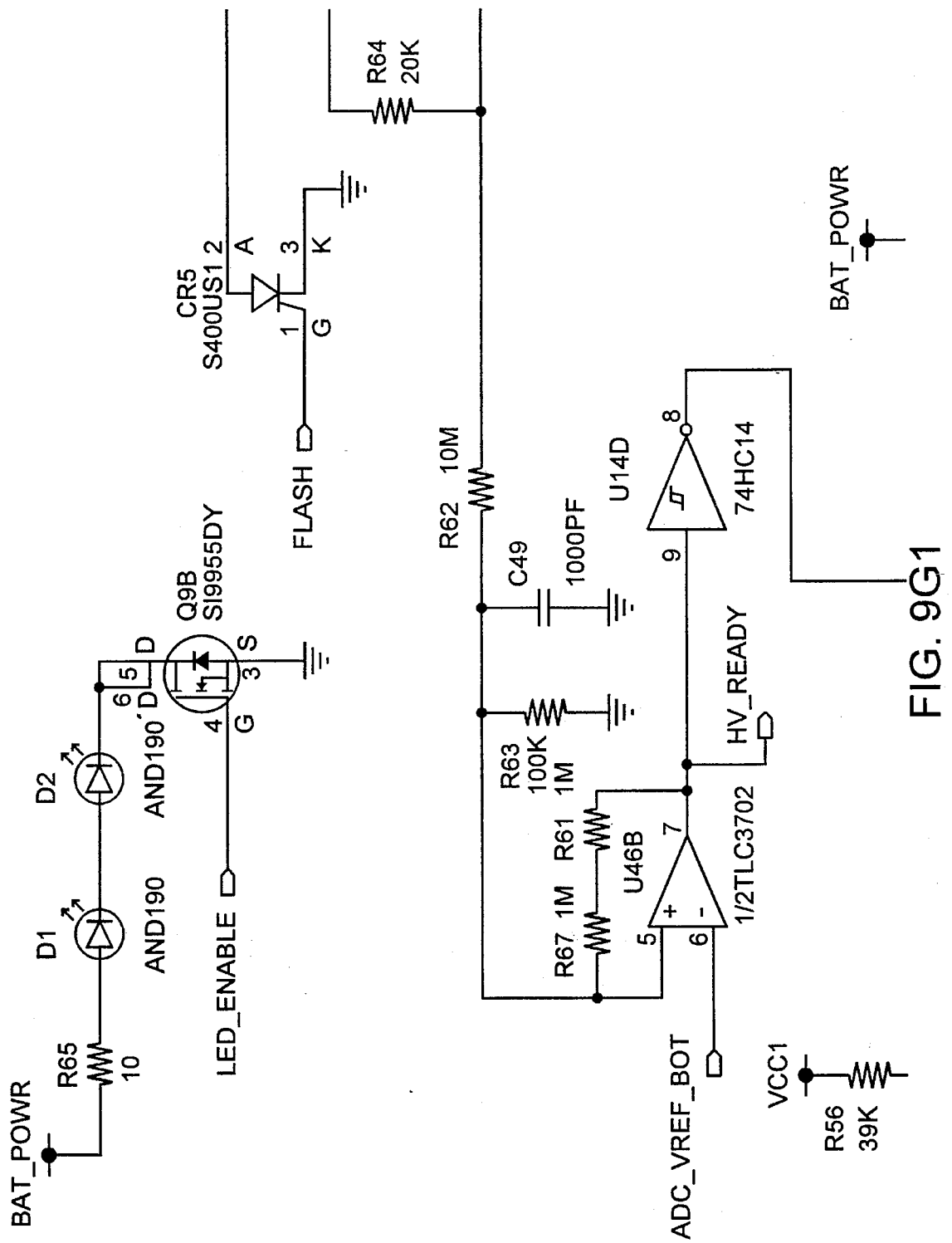
FIG. 9G1

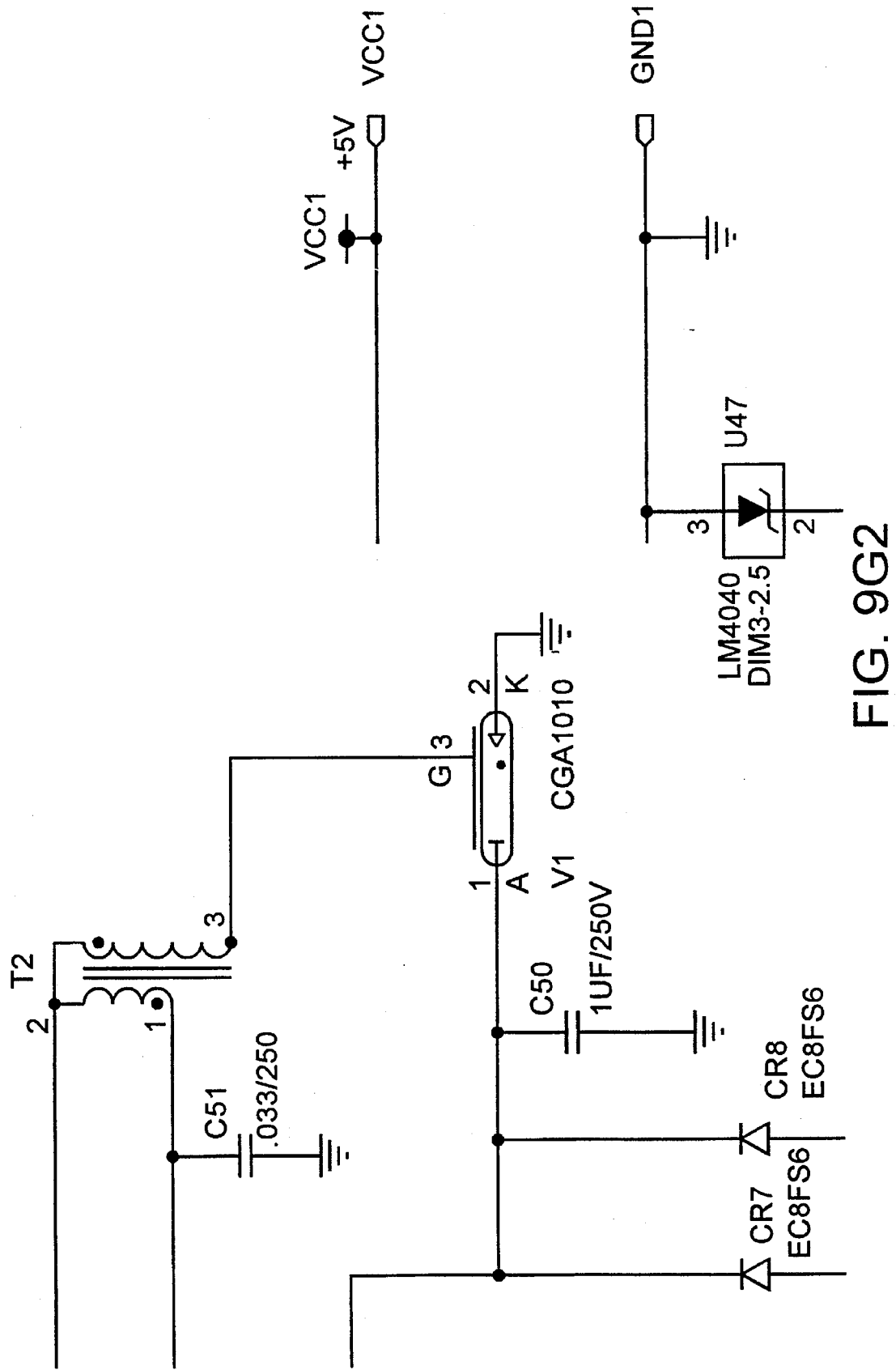
FIG. 9G2

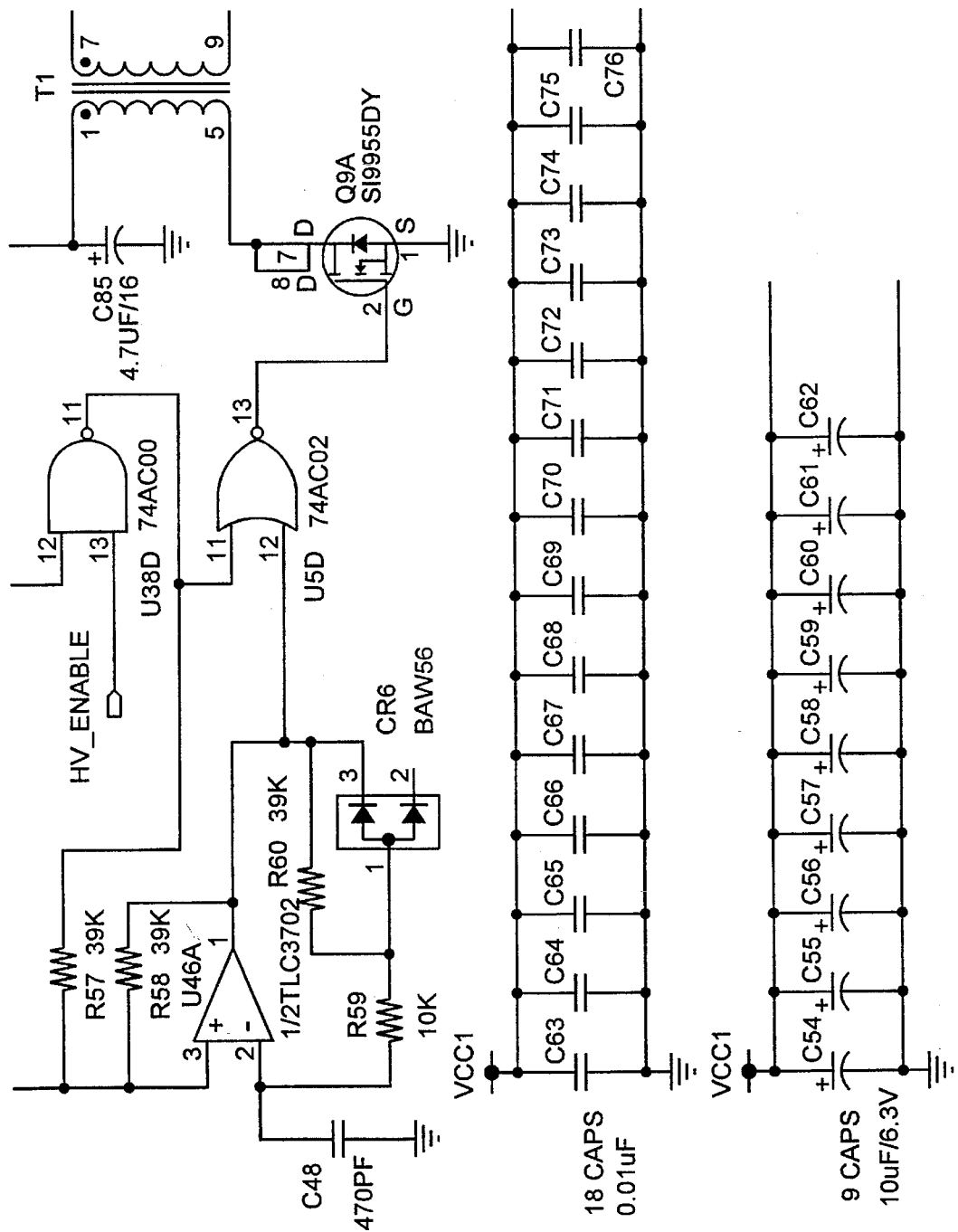
FIG. 9G3

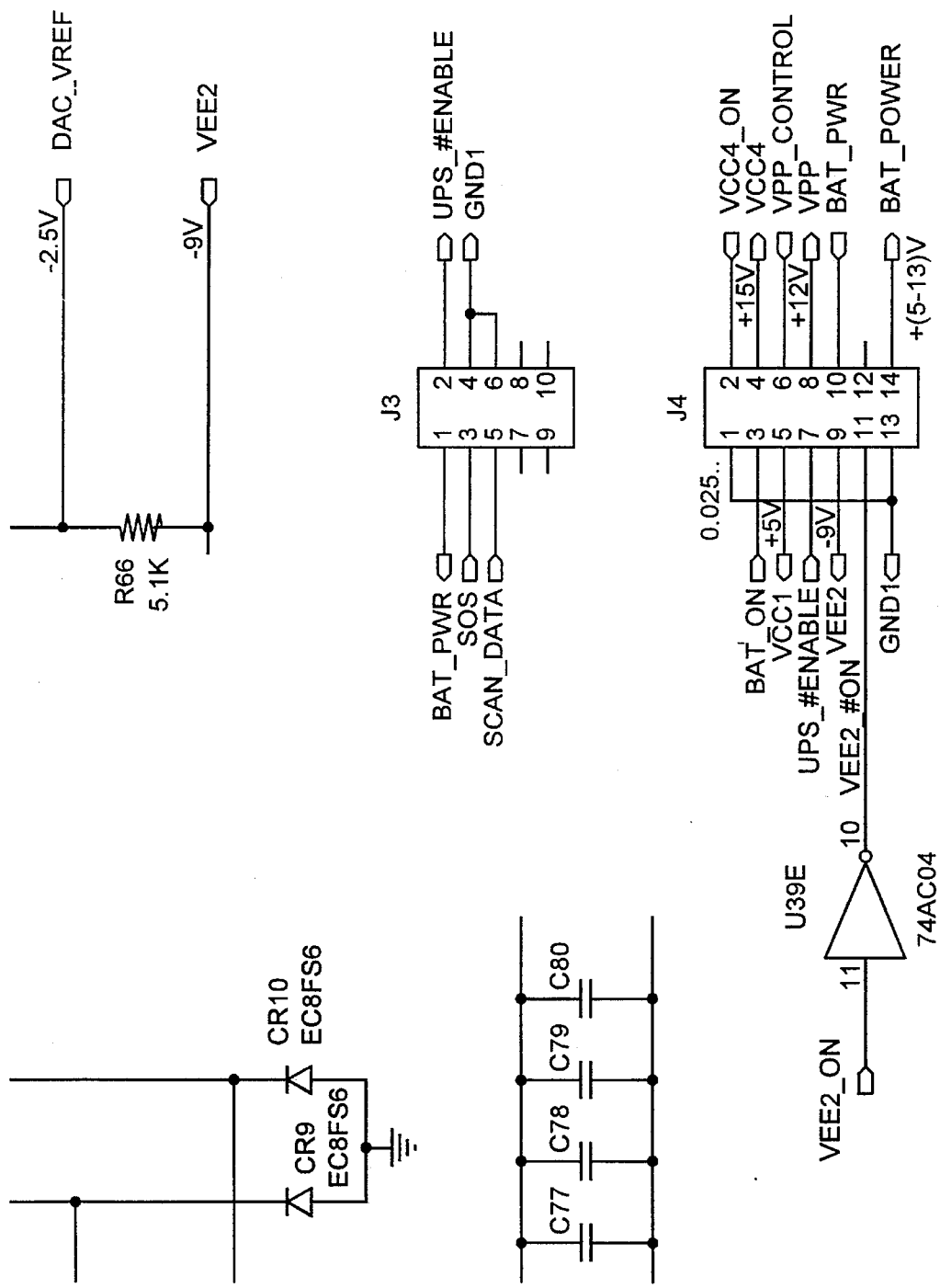
FIG. 9G4

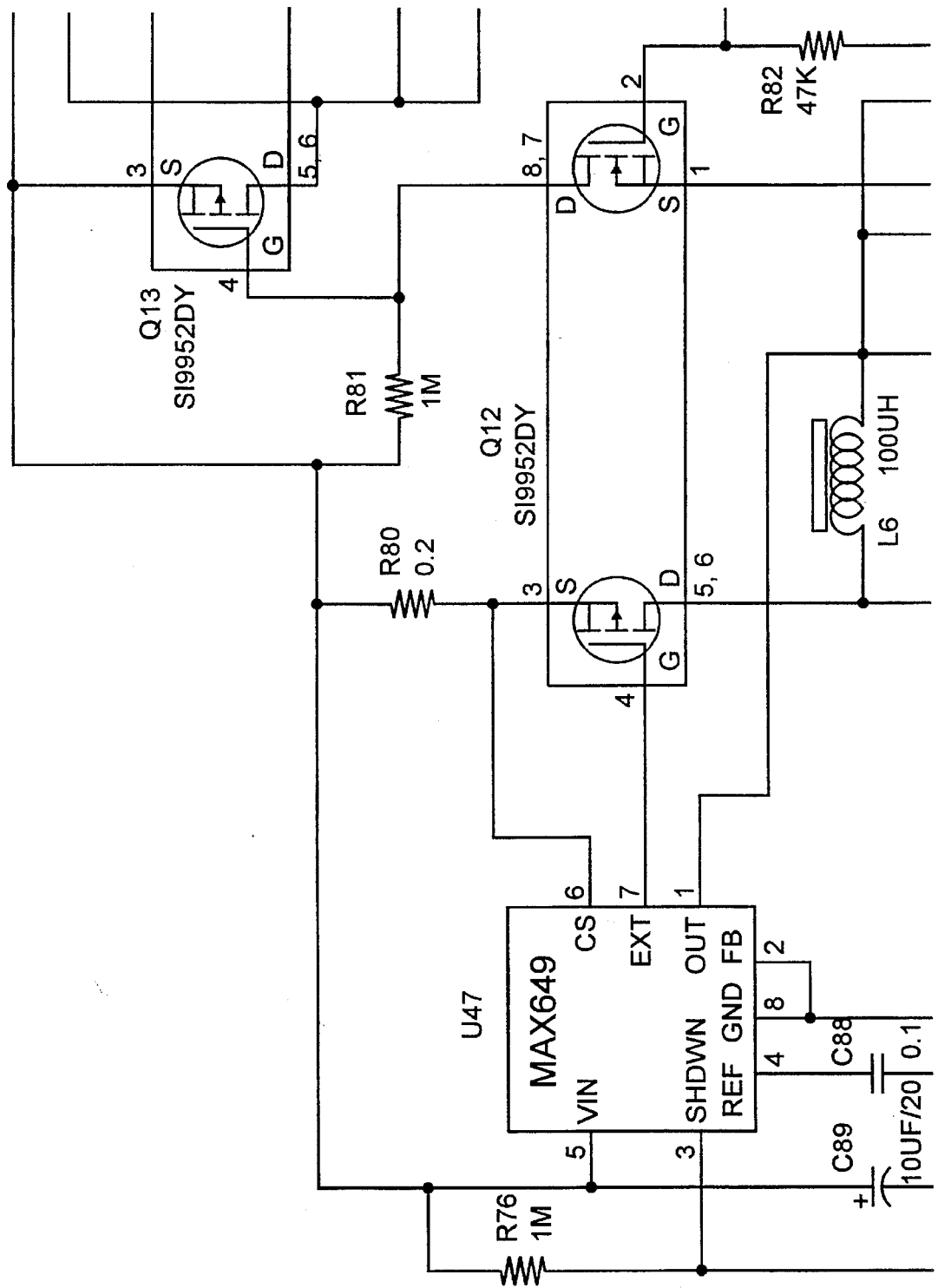
FIG. 9H1

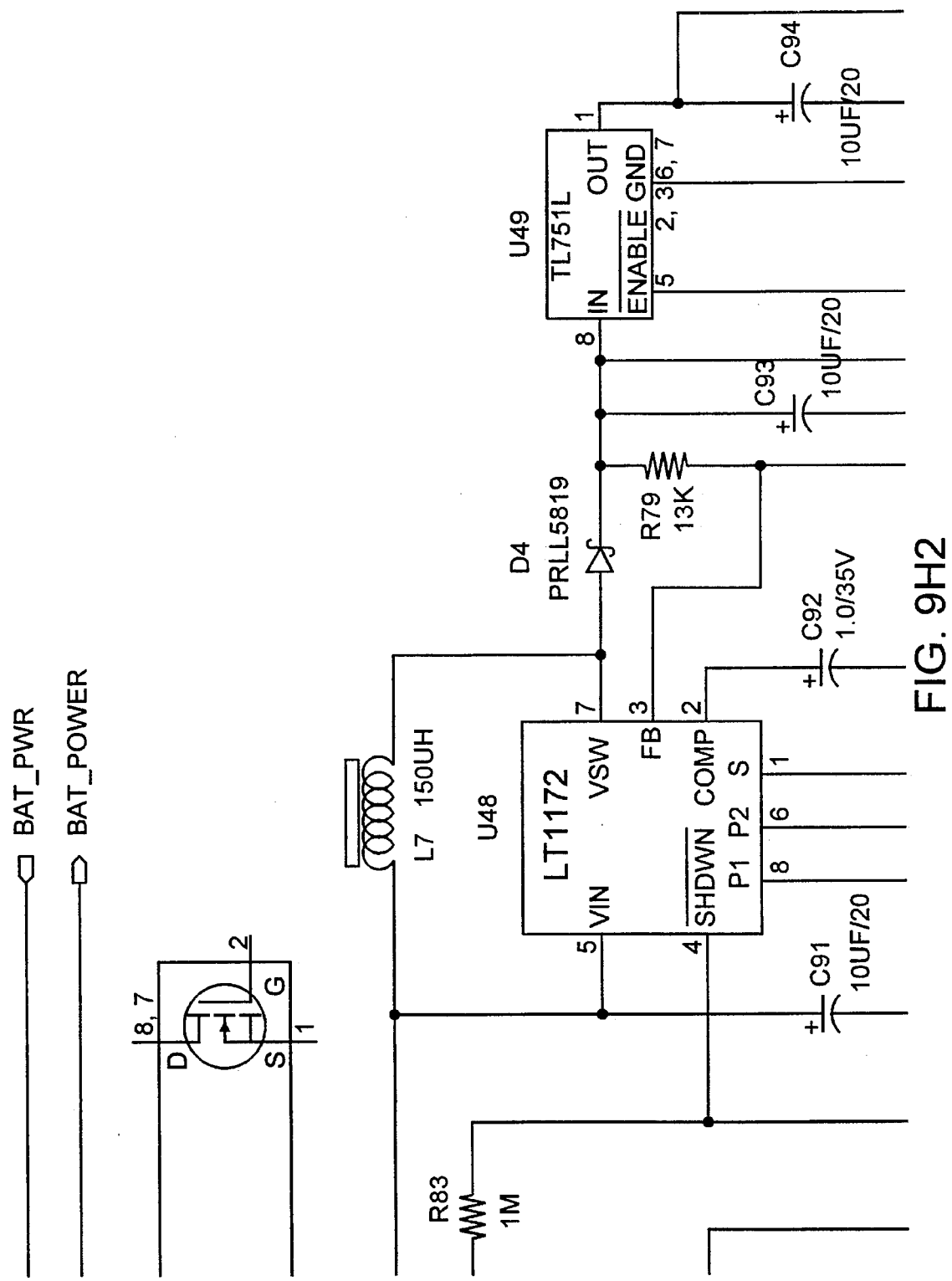
FIG. 9H2

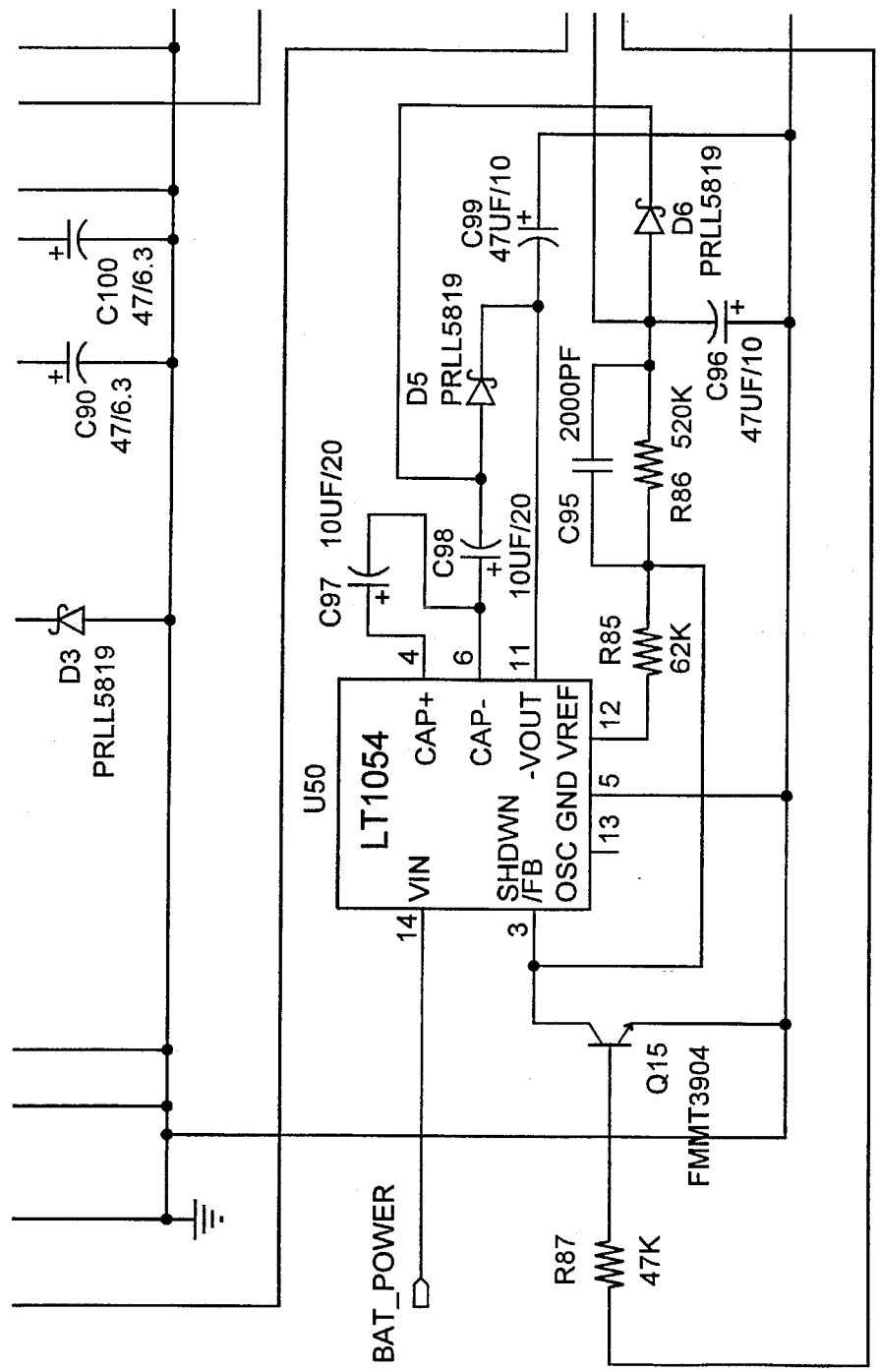
FIG. 9H3

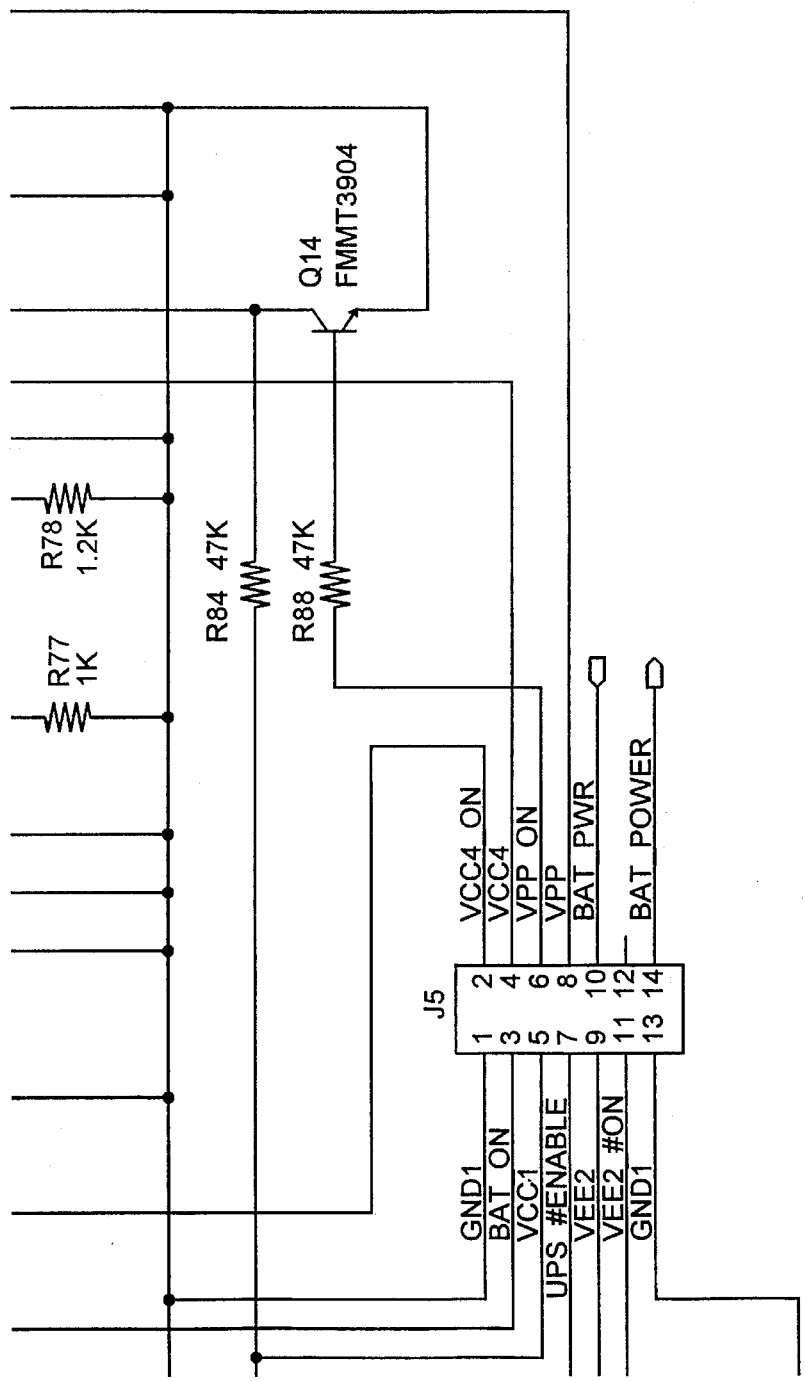
FIG. 9H4

PORTABLE DATA FILE READERS

CROSS REFERENCE TO RELATED APPLICATIONS

The present application is a continuation: in-part of application of Mailing Label TB 632 907 748 US filed Oct. 31, 1994 which in turn was a continuation-in-part application of U.S. Ser. No. 08/298,345 filed 29 Aug. 1994, which in turn was a continuation-in-part of U.S. Ser. No. of 08/241,866 filed 11 May 1994, which in turn was a continuation-in-part of U.S. Ser. No. of 08/170,120 filed on 17 Dec. 1993, which in turn was a continuation-in-part of U.S. Ser. No. 08/067,384 filed on 25 May 1993 which in turn was a continuation-in-part of U.S. Ser. No. 08/060,404 filed on 11 May 199. The foregoing applications are hereby incorporated herein by reference.

TECHNICAL FIELD

This invention relates generally to bar code readers, and more particularly to an improved portable device for reading portable data files and the like.

BACKGROUND ART

Existing two-dimensional portable bar code readers employ a mechanically scanned laser beam. In one type of such reader, the beam is mechanically scanned horizontally as in conventional, one dimensional bar code scanners, while it is also manually scanned vertically with a downward motion of the hand or wrist. In a more sophisticated type of two-dimensional reader, the laser beam is mechanically scanned in both the horizontal and vertical directions utilizing a raster.

These laser readers require that the scanning beam pattern be accurately aligned with the label symbology, with the degree of accuracy being a function of the vertical height of the coding elements versus the horizontal width. Further, reading the two dimensional codes line by line requires stitching separately read lines or words after they are read. Some two dimensional codes (portable data files and the like) do not provide for stitching. A further limitation of laser scanners for two-dimensional reading is that they require a significant amount of time for the label to be read, which of course requires that the scanner remain accurately aligned with the label throughout the reading process.

DISCLOSURE OF THE INVENTION

The present invention utilizes either: (1) a pair of two-dimensional photosensitive arrays (such as charge coupled device arrays), a pair of pointing beams for producing a pair of elongated bright spots on a target, an optical string, control electronics, and a power supply; or (2) a single two-dimensional photosensitive array (such as a charge coupled device array), a pair of pointing beams for producing a pair of elongated bright spots on a target, an optical string, control electronics, and a power supply. Both disclosed embodiments utilize the arrays to pick up label images, convert the image to electrical signals, and process the signals with a microprocessor. In an exemplary embodiment of a two sensor embodiment, each sensor has its own lens system, which provides the proper amount of overlap between the two images produced by the separate optical strings. In both embodiments a focus indicator may be provided to facilitate a user in placing labels to be read at the correct distance from the reader.

BRIEF DESCRIPTION OF THE DRAWINGS

FIG. 6A is a schematic depiction of an embodiment of the invention in which an aiming device used in conjunction with an imaging system;

FIGS. 9A through 9H together comprise an electronic schematic of an exemplary single sensor embodiment of the present invention;

BEST MODE FOR CARRYING OUT THE INVENTION

The following United States Patent Applications are incorporated herein in their entirety by reference: (1) U.S. Ser. No. 08/298,345 filed on 29 Aug. 1994; (2) U.S. Ser. No. 08/170,120 filed on 17 Dec. 1993; (3) U.S. Ser. No. 08/067,384 filed on 25 May 1993; (4) U.S. Ser. No. 08/060,404 filed on 11 May 1993; and (5) U.S. Ser. No. 07/947,673 filed 21 Sep. 1992.

A. First Exemplary Embodiment

One difficulty with current two-dimensional array technology is limited resolution. Commercially available sensors have been developed for television related applications having horizontal resolutions typically limited to 500 to 750 pixels. However, a resolution of from 1000 to 2000 pixels is desirable for providing readability of labels of different sizes and densities.

It is possible to split an image optically and use two sensors with slightly overlapping fields of view. Such an optical system can be based, for example, on a single lens and 50% reflective mirror image splitting optics. This approach, however, suffers from significant losses of optical energy, and also requires complicated optomechanical designs for providing the necessary accuracy and stability.

Figure 1:
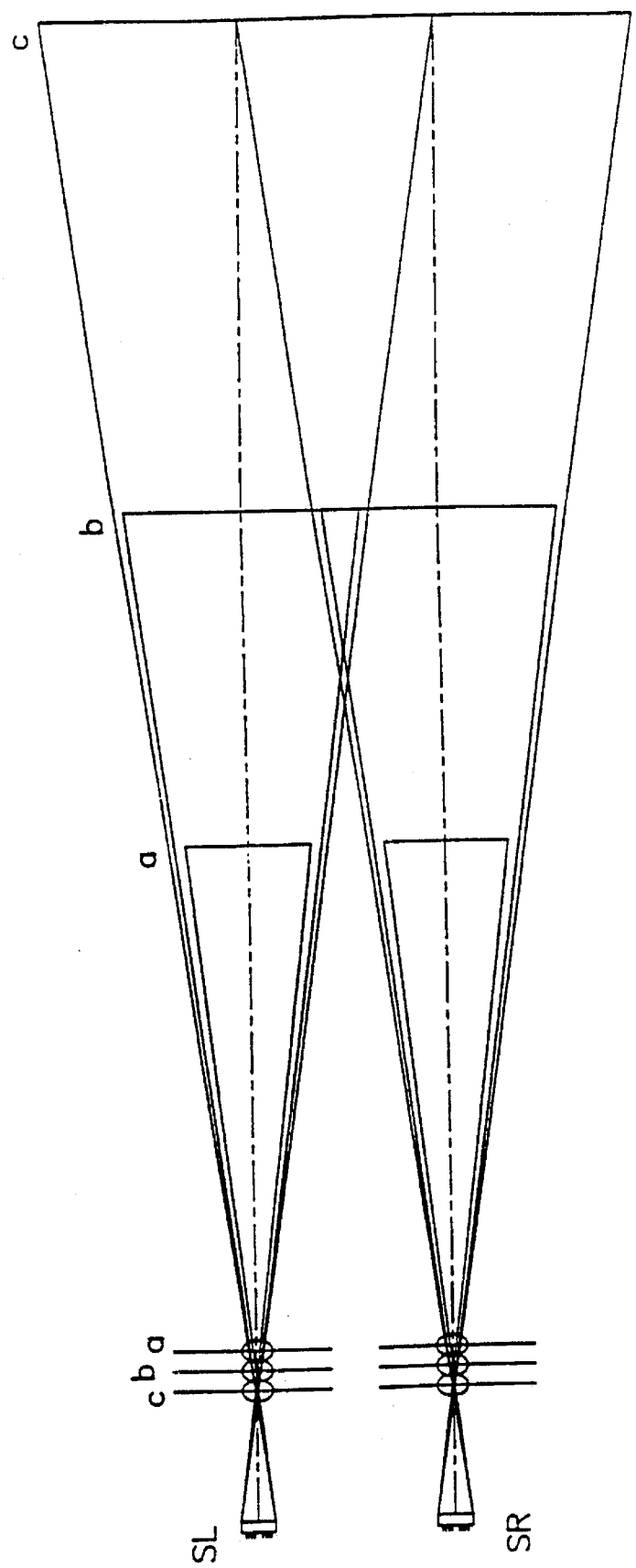
FIG. 1 depicts a conventional pair of sensors, each with its own lens, and shows the image overlap provided with the lenses at various positions.

FIG. 1 depicts such a system based on two lenses, one for each sensor. This system, however, produces the desirable amount of overlap between the left and right images only when the target label is positioned at a fixed distance from the sensors. Turning now to FIG. 1, a label positioned in the vicinity designated by b would be in the correct position so that the half images would overlap properly, but the position a would produce a missing central area, while the position c provides too great an area of overlapping, thereby defeating the purpose of using two sensors.

Figure 2:
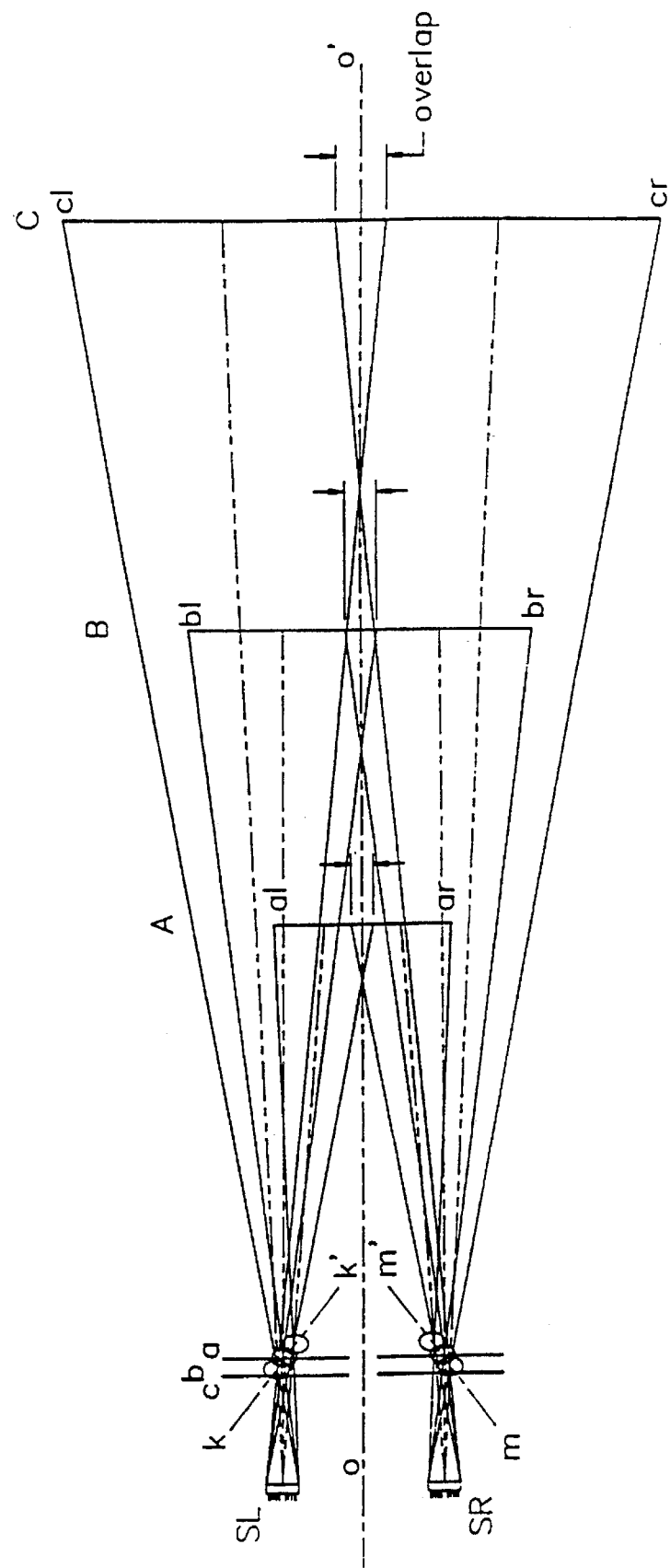
FIG. 2 depict the sensor and lens system of the invention and its corresponding image overlaps.

FIG. 2 also depicts the configuration of an exemplary first embodiment of the present invention. Again, two sensors are used, each with its own lens. These sensors are fixed in a common plane. Automatic focusing is provided by placing the lenses on a carriage that moves toward and away from the sensors. These lenses are mounted on the carriage in such a way that, as the carriage moves away from the sensors, the distance between lenses decreases. As the carriage moves toward the sensors, the distance between the lenses increases. As seen in FIG. 2, the lines k–k' and m–m' represent the trajectories of the left and right lenses corresponding to the carriage position moving from c to a. The zones A, B, and C correspondingly show the amount of image overlap between the left and right halves of the total field of view of the system. As may be seen, this overlap is the same percentage area for each zone. Therefore, the high total resolution achieved by using two sensors is preserved throughout the entire focusing range of the system.

Figure 3:
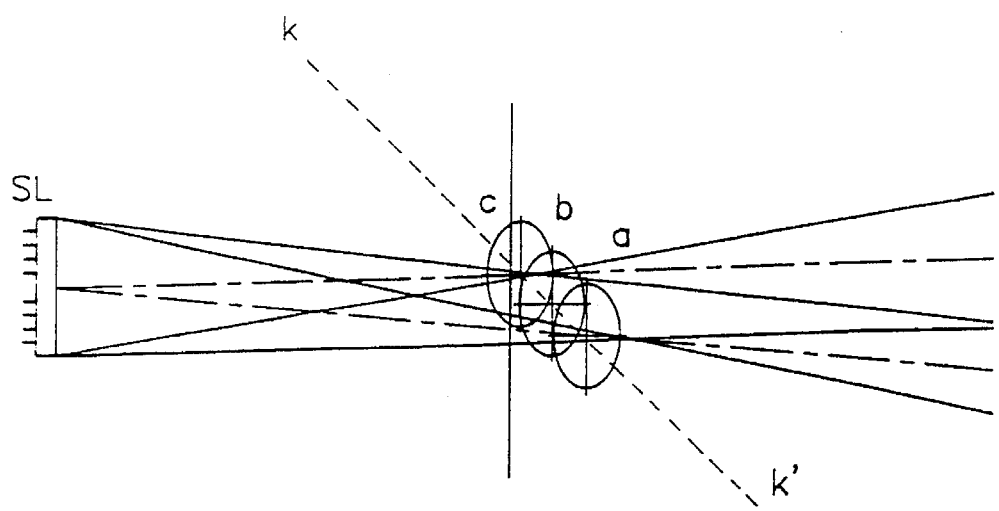
FIG. 3 is an enlarged view of the positioning of the left lens of FIG. 2.

FIG. 3 illustrates, in greater detail, the position of the left lens during focusing. The individual lens viewing angle must be larger than would be required for ordinary imaging of the same field since the axis of the sensor's sight (originating in the center of the sensor) skews away from the optical axis of the lens when the carriage is in other than the midpoint position.

Figure 4:
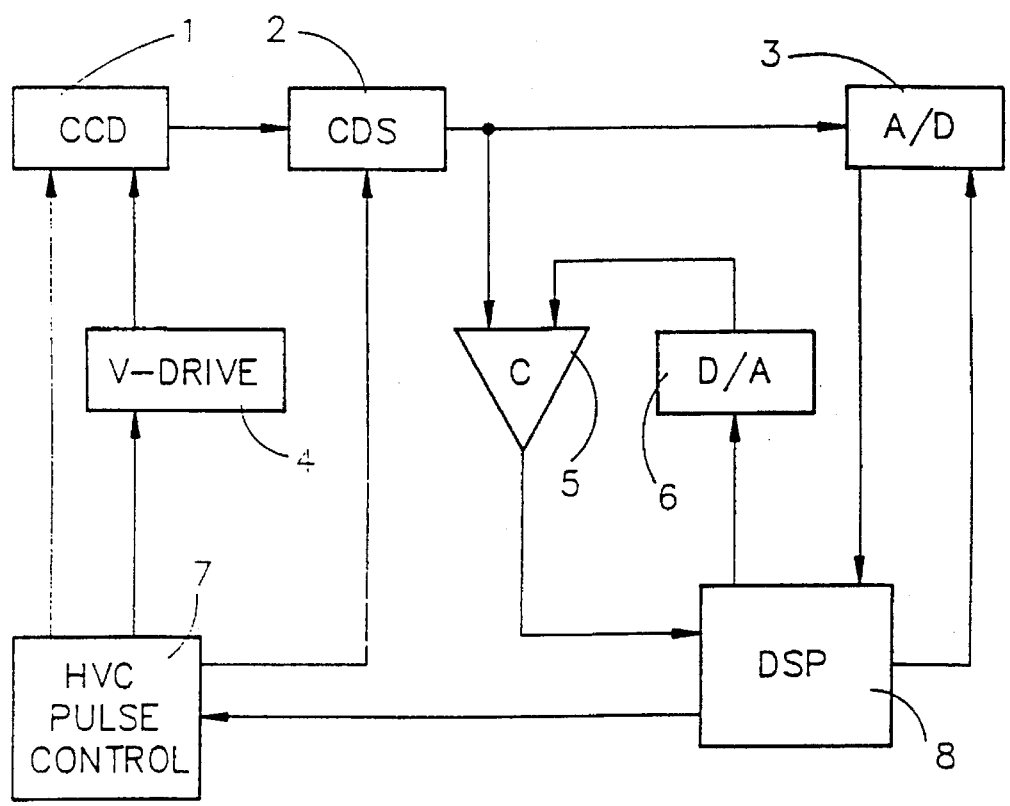
FIG. 4 is a block diagram of the present invention.

The block diagram of FIG. 4 depicts the major components of a portable data file reader. Before a two-dimensional CCD device or the like may be utilized as an image sensor for reading two-dimensional optical information sets, two problems must be overcome: first, the difficulty inherent in processing the data produced by a two-dimensional array, and second, the difficulty inherent in minimizing memory space requirements when working with the array's data output.

The present invention solves these problems in part via utilization of the CCD sensor storage capability. Both vertical and horizontal CCD shift registers are, in essence, analog storage devices used as an intermediate Read Once Memory (ROM), situated between the array of the photo receptors (photodiodes) and the image processing hardware. The system architecture, represented in FIG. 4 allows the microcontroller 8 (referred to as a DSP) to have direct control over the sensor 1 scanning processes via HVC pulse control circuit 7. This HVC circuit generates the clock pulses necessary for moving electrical charges from the photodiodes to the vertical shift registers, for moving charges in the vertical registers, for shifting them inside the horizontal shift register and for controlling the correlated double sampling device (CDS) 2. The vertical driver 4 serves as a power stage for the vertical clock pulses. The microprocessor 8 originates the control signals to the HVC chip 7. These signals, where a CCD type device is utilized, cause the CCD to perform an image charge transfer, a line by line vertical shift and a pixel by pixel horizontal shift.

The analog signal appearing on the output of the CDS chip 2 is available to the inputs of the ND converter 3 and the comparator 5. The other input of the comparator is connected with the output of the D/A device 6. The D/A is equipped with an internal input latch. This architecture provides:

(1) line shifting separately from pixel scanning;
(2) shifting pixels along the horizontal register either by processing the pixel data or dumping it;
(3) input the pixel illuminance values to the DSP as gray scale values produced by the high resolution A/D converter 3;
(4) input the pixel illuminance values as black/white single bit values produced by the data reduction comparator 5.

So as to obtain a decodable image some image corrective actions are also provided, e.g., exposure adjustment, focusing adjustment (long range readers). An exemplary solution is to take a service image or service frame, measure certain parameters of the image such as image quality (contrast, brightness, sharpness, and the like) adjust the sensor control parameters and take a second improved image frame.

Since information about image quality is redundant, it is not necessary to study the entire image. This is where the direct control of the vertical shift becomes useful. Since the luminosity distribution along the image area may not be uniform, it may be necessary to study the whole image frame area, but with the limited sampling frequency. Since the non-uniformity of the distribution of the signal bright and dark levels is usually a smooth function of x and y sensor coordinates, samples of this function may be taken infrequently, for example as a matrix of 10 samples evenly spread along horizontal lines by 10 samples vertically, i.e., 100 samples. Based on these samples, the corrections for the next frame may be accomplished.

When the "service frame" is of acceptable quality, the before mentioned samples are used to calculate the threshold function for the next frame image data compression. The threshold function is a 3-D surface that is stretched in the coordinate of x and y sensor pixels and having vertical coordinate as the image brightness or illuminance. If properly calculated, this surface must intersect the image 3-D function on the middle level between the dark and bright levels of a portable data file image. Having only about 100 points, representing the threshold surface, small memory storage is required. When the "info-frame" (service frame) is taken for image processing, the DSP outputs the threshold points to the D/A converter at the appropriate moments during the frame scanning. These points are locked in the D/A's latch until they are updated with the following values by the DSP. The comparator 5 compares each pixel value with the threshold surface and produces a high contrast black/white image. This compressed image data is read by the DSP either through polling or the interrupt, which occurs at each transition from black to white and from white to black.

The "info-frame" (service frame) processing is combined with image acquisition. Since the regions of the label image carry enough information for decoding data residing in those regions, it is not necessary to have a complete image from a pre-stored memory prior to starting the decoding process. To save memory, only a limited number of lines are acquired, digitized and stored in the DSP RAM. Practically, about 40 lines may be stored in the processing image buffer. After a current strip of an image has been decoded, the strip of the next 40 lines is acquired from the sensor and is placed in the same buffer abutted to the preceding strip. Only a few lines from the preceding strip is required, to assure continuity. The number of this overlap depends on the structure of the label code and the desired skew angle tolerance. Thus, the processing image buffer is a circular buffer, with some 40 plus lines of the digitized image. A minimum memory capacity for this kind of buffer is: 50 lines ×750 pixels per line =37500 bits or 2344 words.

Thus, the aforementioned description denotes how economizing of both processing time and computing facilities is accomplished.

Figure 5:
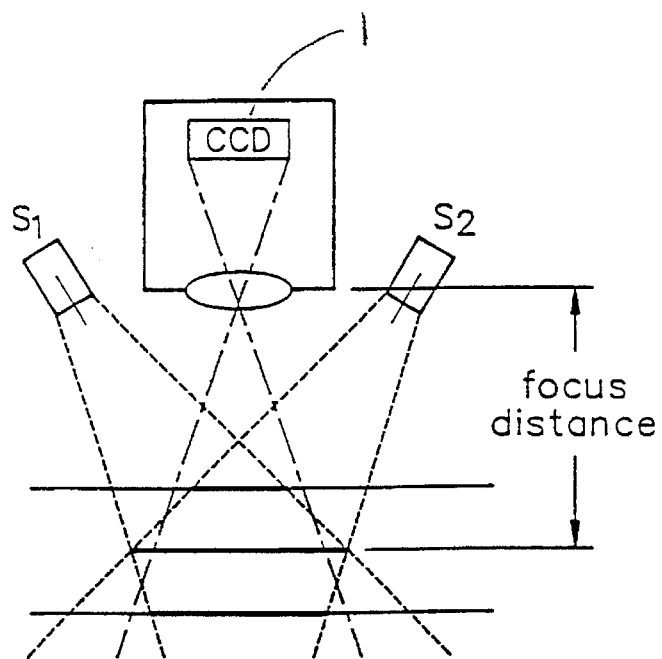
FIG. 5 is a positioning device of the present invention.

FIG. 5 depicts a reader positioning apparatus. S1 and S2 each produce illuminating beams, which converge at a position from the reader where a two-dimensional bar code is focused. In this embodiment the illuminating spot is rectangular, and outlines the viewing area.

Figure 6:
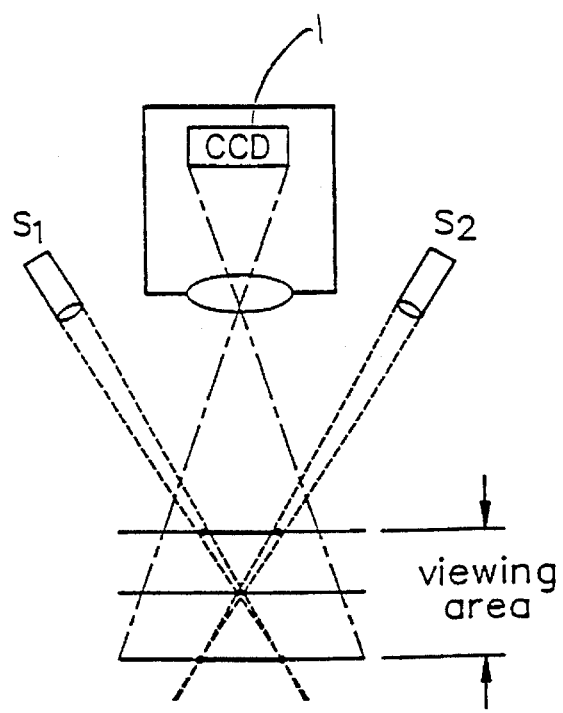
FIG. 6 is an alternative first embodiment of an aiming device.

An alternative first embodiment of a reader aiming device is depicted in FIG. 6. In this embodiment, S1 and S2 produce narrow beams of light which converge to indicate the center of the viewing area and the optimum focus distance. FIG. 6a depicts the reader aiming device of FIG. 6 used in conjunction with an imaging system having dual photosensitive arrays and adjustable lenses as depicted in FIG. 2.

B. Second Exemplary Embodiment

Figure 8:
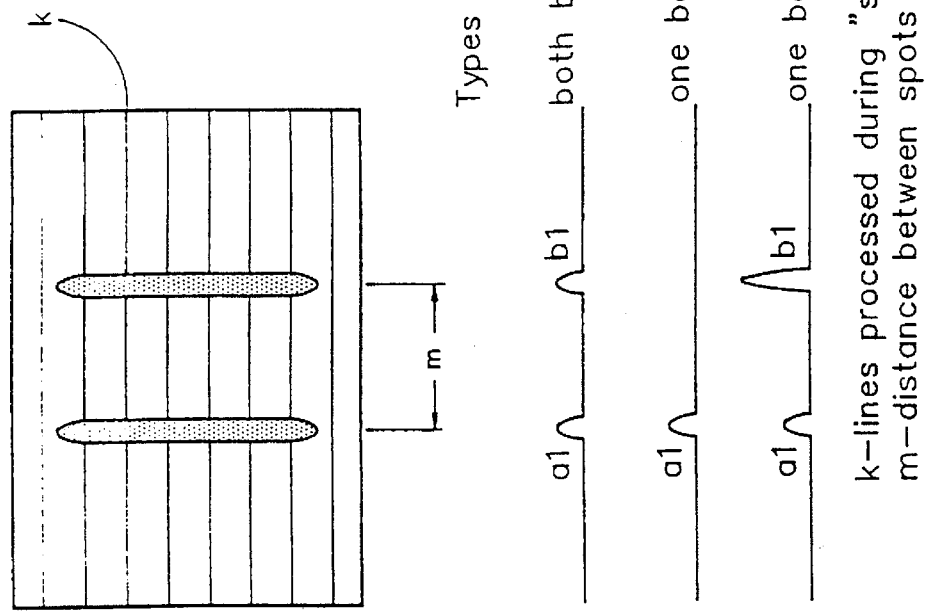
FIG. 8 is a graphical representation of beam signal outputs from a reader according to the second embodiment described herein.
Figure 7:
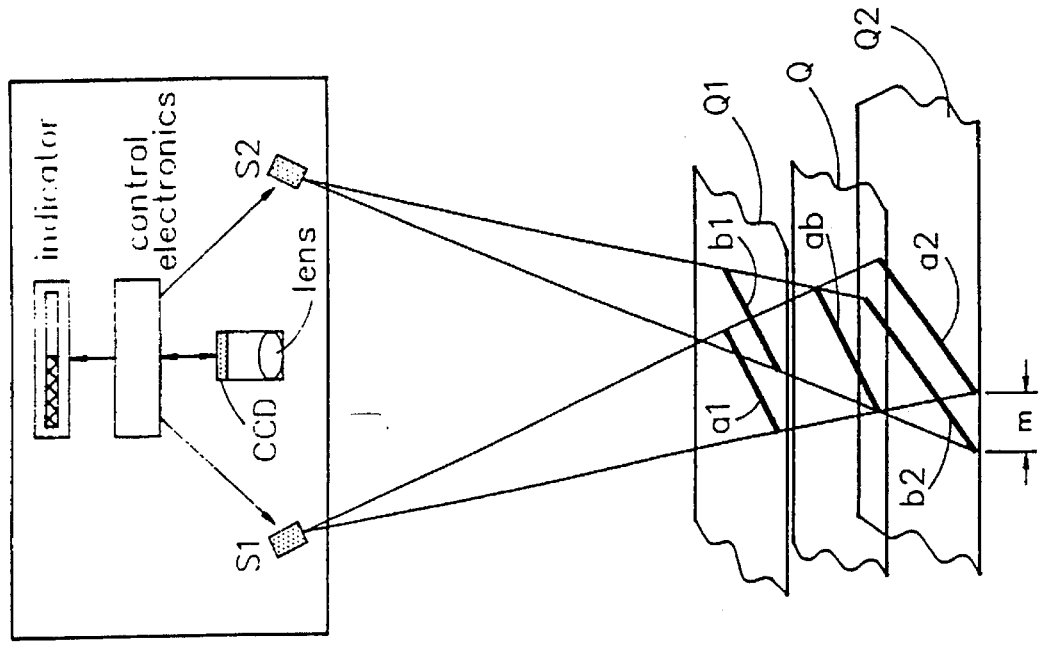
FIG. 7 is a diagrammatic illustration of the components of a second embodiment wherein a single two-dimensional photosensitive array is utilized.

FIGS. 7 and 8 depict a second exemplary embodiment for a two-dimensional portable optically readable information reader. Turning first to FIG. 7 wherein it may be seen that two pointing beams are provided (S1 and S2) for producing elongated bright spots (a and b) on a target surface Q. When this surface lies in a plan at a readable distance from the reader, both spots (a and b) merge. Conversely, where the target surface lies in a plane which is not at a readable distance from the reader, the spots (a and b) are separated by a distance m, which is a function of the displacement of the target surface from the best focus position.

The beams may have a wavelength selected from the visible portion of the electromagnetic spectrum (such as those produce from red or green LED's), or infrared sources may be utilized. In either case the elongated profile of the beams facilitates capturing of the spots by the array during the taking of a service frame (FIG. 8), which is processed much faster than an ordinary data frame. This reduction in processing time is accomplished by simply skipping most of the horizontal lines in the frame and studying only about three percent (3%) of the regularly spaced lines. Elongated or fan shaped spots (a and b) are preferred since round or narrow spots may be missed if the spot's image fell between the active horizontal lines of a service frame.

The distance m is then measured by the reader's computer and is displayed on the indicator (e.g., as a line of variable length, or as a sound of variable pitch) such that an operator may quickly adjust the distance between the reader and the target even where the label to be read and the spots (S1 and S2) are not visible.

If the distance m between the spot images is defined as:

$$m=b-a$$

and a and b are horizontal coordinates of the spots in the service frame, it becomes negative when a>b, this is true when the target surface Q is out of range. So the sign of the m distance is an indicator of whether the surface Q is too close or too far from the best focus distance. For positive identification of the spots (a and b) the computer may turn the beams (S1 and S2) on and off or otherwise control the amount of energy in each separately in sequential service frames.

As noted before, the "service frame" provides all necessary information for adjustments, so an image of acceptable quality can be made, such that the "info frame" may be processed successfully and quickly.

This may be accomplished according to the following: (1) the selected sensor for this application has a matrix of 752×582 useful pixels; (2) there are two fields: odd and even; (3) each field consists of 291 interlaced horizontal lines; (4) each line has 752 pixels; (5) any one field contains sufficient data for a "service frame", therefore after processing one "service field" a decision may be made regarding adjustments before another "service field" or an "info frame" is taken.

During acquisition of a "service field" only 12 equally spaced horizontal lines are processed (one in each of 24 lines). The other 23 lines of each 24 are skipped (not acquired). Skipping or dumping of the lines may be done with a much higher rate (20 MHz in the present embodiment). The 12 active lines are processed in the following manner: (1) each line is divided in 16 sections of 47 pixels each; (2) one half of each section (24 pixels) is taken for processing, while another half (23 pixels) is skipped; (3) out of the 24 pixel values two extreme values, brightest and darkest, are found and their differences are stored in a "modulation array". The modulation array is organized as a OfHxObH (16×12 decimal) matrix. A mean value for each of the 24 pixel strips is also calculated and stored in the "threshold array", organized similarly to a "modulation array". The examples of both arrays are shown in the following tables:

TABLE 1

| | | | | | | | Row Threshold | | | | | | | | | |
|---|---|---|---|---|---|---|---|---|---|---|---|---|---|---|---|---|
| | 0 | 1 | 2 | 3 | 4 | 5 | 6 | 7 | 8 | 9 | a | b | c | d | e | f |
| 0 | 00ad | 00c0 | 00d0 | 00da | 00db | 00e2 | 00e0 | 00ec | 00e9 | 00f1 | 00fb | 00fd | 00f0 | 00e5 | 00e4 | 00d9 |
| 1 | 00b2 | 00c5 | 00d9 | 00db | 00e6 | 00ea | 00f8 | 00fa | 00fc | 010b | 0110 | 0112 | 00f8 | 00fa | 00f1 | 00e3 |
| 2 | 00b3 | 00c8 | 00d2 | 00e2 | 00ec | 00fa | 00c3 | 00cb | 00c3 | 00bc | 00c6 | 011a | 0119 | 0104 | 0101 | 00f5 |
| 3 | 00af | 00bf | 00da | 00e3 | 00fb | 0110 | 00ad | 00b1 | 00a8 | 00ab | 00ec | 0123 | 0121 | 0123 | 0121 | 0108 |
| 4 | 00bd | 00d2 | 00d9 | 00f1 | 00fc | 010b | 0095 | 00ba | 00ab | 00b4 | 00bb | 0126 | 0128 | 0122 | 0120 | 011a |
| 5 | 00c3 | 00d5 | 00e2 | 00f4 | 00fb | 0111 | 00c2 | 00b6 | 00be | 00bd | 00c2 | 012b | 0121 | 0121 | 0120 | 010c |
| 6 | 0060 | 00c3 | 00e0 | 00ea | 0100 | 0103 | 0118 | 0121 | 0123 | 0126 | 0129 | 0128 | 0122 | 011b | 0119 | 0102 |
| 7 | 00ae | 00bd | 00db | 00e9 | 00fe | 0103 | 011b | 0120 | 0128 | 0132 | 0132 | 0132 | 0123 | 011b | 0119 | 0102 |
| 8 | 00b1 | 00cd | 00e0 | 00e4 | 00fc | 010d | 0120 | 0122 | 011b | 0123 | 012c | 0129 | 0121 | 011a | 0111 | 00f4 |
| 9 | 006d | 0089 | 0099 | 00a3 | 00b9 | 00c9 | 0110 | 011a | 0121 | 0121 | 0122 | 0121 | 0112 | 0113 | 0100 | 00f5 |
| a | 00bf | 00cd | 00e0 | 00eb | 00f2 | 0104 | 0118 | 011b | 0118 | 011a | 011b | 0119 | 0101 | 0105 | 00f1 | 00f0 |
| b | 00be | 00d3 | 00e1 | 00f1 | 00f4 | 00fd | 0104 | 0119 | 0118 | 011b | 011b | 011b | 0105 | 0103 | 00f3 | 00e2 |

TABLE 2

Row Modulation

|   | 370 | 3ad | 3ba | 392 | 40b | 504 | 61f | 66f | 641 | 519 | 40e | 30d | 327 | 336 |   |
|---|-----|-----|-----|-----|-----|-----|-----|-----|-----|-----|-----|-----|-----|-----|---|
| 0 | 0011 | 0018 | 0018 | 0012 | 0013 | 001a | 0018 | 001e | 001f | 0017 | 0023 | 001f | 0018 | 0017 | 001a | 0011 |
| 1 | 0014 | 0017 | 0011 | 0013 | 0018 | 0012 | 0010 | 0010 | 0010 | 0003 | 0008 | 000a | 0010 | 0012 | 0019 | 000b |
| 2 | 0013 | 0010 | 000a | 0018 | 000e | 0010 | 0045 | 0051 | 0055 | 004e | 0048 | 0012 | 0011 | 0016 | 0017 | 0019 |
| 3 | 0017 | 001f | 0012 | 0015 | 0013 | 0008 | 0061 | 0067 | 0060 | 0063 | 0042 | 0019 | 0019 | 001b | 0019 | 0020 |
| 4 | 001b | 000a | 000f | 0017 | 0012 | 0003 | 0049 | 0072 | 005d | 0068 | 005d | 001f | 0020 | 001a | 0018 | 0012 |
| 5 | 0015 | 0015 | 001a | 001a | 0013 | 0009 | 0048 | 0058 | 0060 | 0061 | 0068 | 0013 | 0017 | 0019 | 0018 | 001e |
| 6 | 0012 | 0017 | 0018 | 001e | 0018 | 001b | 0010 | 0019 | 0019 | 0013 | 0011 | 0010 | 0016 | 0013 | 0011 | 001a |
| 7 | 0014 | 001b | 0013 | 0021 | 0020 | 001b | 0013 | 0018 | 0020 | 001a | 001a | 001a | 0019 | 0013 | 0011 | 001a |
| 8 | 0011 | 0011 | 0018 | 0016 | 001e | 001f | 0018 | 001a | 0013 | 0019 | 001e | 0011 | 0019 | 0012 | 0017 | 0018 |
| 9 | 002d | 003f | 0051 | 004b | 0041 | 003f | 0008 | 0012 | 0019 | 0019 | 001a | 0019 | 000a | 000b | 0018 | 0019 |
| a | 0011 | 0013 | 0018 | 0013 | 0016 | 0016 | 0010 | 0013 | 0010 | 0012 | 0013 | 0011 | 0019 | 0017 | 0019 | 0018 |
| b | 001e | 0019 | 0019 | 0019 | 001a | 0011 | 0016 | 0011 | 0010 | 0013 | 0013 | 0013 | 0019 | 001b | 001b | 001a |
|   | 0 | 1 | 2 | 3 | 4 | 5 | 6 | 7 | 8 | 9 | a | b | c | d | e | f |

The modulation array reflects areas of data activity in the image frame. The rectangular area with the xy coordinates (column * row) of: 62, 65, a2, a5 has elevated modulation values and indicates the image of the label (in this particular example a UPS-code label was used.). The next procedure pinpoints the middle of the area of interest. For this purpose a low pass spatial filter is applied to the array of modulations as a running window of 3 units wide, independently of horizontal and vertical coordinates. The result of this processing is the two linear arrays (14 and 10 values long correspondingly). Maximum values (and the label middle)is indicated in bold typeface.

The next object is to identify the boundaries of the label area. For this purpose a tolerance value is calculated as a function of an average modulation in the middle of the label (Mm) and average modulation for a large vicinity, surrounding the label (Mv).

$$Mm = 1/9 \; m9$$

Modulations of 9 elements of a 3×3 matrix with the determined label center in the matrix are added together and divided by 9.

$$Mv = 1/81 \; m81$$

A similar operation is performed on 81 elements of a 9×9 matrix. Thus, a tolerance value $Tm = (k * Mm + Mv)/2 \; k$. For this example k=4 is an optimum because the vicinity area (81 points) is 4 times greater than the label area (4×5=20 points). Next, the modulation values are being compared with the tolerance value, starting from the determined label center, and moving outward until lesser than Tm values are found. One more row or column is then added to this area for safety. The x and y coordinates, outlining the zone of the label are stored. These coordinates are used for optimum processing of the info-frame. All lines preceding (and following) the outlined zone in the frame may be disregarded. The information positioned to the left and to the right of the outlined zone may also be disregarded and need not be acquired. This process of line skipping and pixel skipping substantially reduces the image processing time.

Threshold surface values may be found by simply averaging 9 threshold values for a 3×3 matrix surrounding the determined label center and applying this averaged threshold for the whole zone. This method is acceptable for relatively small size labels (like UPS-code labels), for which variations of illumination intensity do not vary significantly within the label area. For large size labels, (like some PDF 0417 code labels) adaptation of the threshold surface within the label boundaries is required. In this case, in the array of "row" thresholds, each number situated externally to the label and immediately next to a threshold value on the border of the label (more accurately, a blob representing a presumed label), is substituted with the value of the nearest blob value for the purpose of calculations. Then the low pass 3×3 filter is applied to the area inside the blob boundaries. The resultant array of smoothened threshold values then may be used as the thresholding surface for the fast preprocessing of the info-frame. As discussed earlier, these values are loaded by the DSP in to the comparator during the info-frame acquisitions.

C. Exposure Control

In order to properly function in a variety of lighting conditions the present invention is preferably provided with exposure control means. Ambient light conditions may commonly range from 3 to 100,000 lux. An office illuminated by fluorescent lamps typically ranges from 300 to 500 lux. Fluorescent lights normally flicker at a frequency of twice the alternating power source frequency.

Therefore, a preferred embodiment of the present invention should work in flickering lighting conditions and be adjustable from 30,000 to 1. The ratio between the maximum and minimum instant values of illumination intensities are normally on the order of 3 to 1 (where 90° phase shift lighting is not utilized). It is also necessary, in a preferred exemplary embodiment that sensor sensitivity adjustments take place in an order of milliseconds such that the amount of time remaining for image acquisition and decoding is optimized.

As disclosed herein, the present invention describes a method and apparatus for reading two-dimensional optical information sets, which delivers image information sequentially in "frames" which are divided in two fields where a interlaced type television sensor is utilized. Where a non-interlaced sensor is utilized each "frame" constitutes a single field. According to the present invention these fields may be classified into two groups, i.e., "service-field" and "information field." Service fields are processed much more rapidly than are information fields. Service fields are processed only for camera house-keeping purposes, i.e., sensitivity adjustments and the like. In an exemplary preferred embodiment sensitivity adjustments may be made according to the following method:

(a) A first field is taken with a default exposure of 417 μs where a non-interlaced sensor is utilized. Where an interlaced sensor is utilized the first field is exposed for 417 μs and the second field is exposed for 50 μs.

(b) The first field is analyzed to determine the ambient light level (illumination level). Where the level of illumination of the first field is insufficient the exposure time is increased, in such a case two conditions are possible:

(1) The signal level is determined to be reliable for calculating an optimal exposure time (in such a case the exposure time is modified accordingly and an information-field is acquired). The maximum exposure time is 4.17 ms (based upon empirical studies of image smear caused by hand motion and the like), and the tolerable exposure time is between 4 to 5 ms (by selecting 4.17 ms certain advantages are obtained). If the required optimum exposure is between 4.17 ms and 12 ms (dim level), the information-field is taken with 4.17 ms exposure and the ADC reference levels are adjusted to preserve contrast ("image normalization"). If exposure time is calculated to be more than 12 ms (dim level), then auxiliary lighting is utilized (xenon strobe light or the like) during acquisition of the information-field.

(2) The signal level is found to be too small to calculate optimum exposure. In this case the auxiliary light source is also used (assuming very dark ambient lighting conditions).

(c) If the first service field, taken with the default exposure, produced an image which is too bright, a second service-field is taken with the exposure reduced by a factor of ten (47 microseconds). With this exposure setting an accurate prediction of optimal exposure may be made. However, if the image is still to bright a third (or subsequent) service-field may be taken. When an unsaturated white level is determined optimum exposure time is calculated and the information-field is acquired.

D. Aiming and Triggering

Once activated by a user (via suitable activation means such as a trigger, switch, voice activation, or code recognition system) or a HOST computer the apparatus begins to obtain "service fields." The DSP processes these "service fields" rapidly since only a few lines distributed throughout the field are processed. The DSP then measures the signal level and adjusts exposure to within optimum limits. The DSP then determines range and/or focal length via a look-up register (the specifications of U.S. Ser. No. (1) 07/960,520 filed Oct. 13, 1992; (2) 08/277,132 filed Jul. 9, 1994; (3) 07/1947,673 filed Sep. 21, 1992; and (4) 08/281,884 filed Jul. 28, 1994 are hereby incorporated by reference in their entirety).

In a simplified exemplary embodiment, an apparatus according to the present invention may then produce two beams of visible light (with the imaging lens, for example, situated between them). The beams converge in one spot at the targeted distance. The DSP may activate the beams whenever it is desirable to obtain a field with the beam spots present. In another exemplary embodiment the apparatus of the present invention may obtain range and focusing information by analyzing the shape of the fiducial marks produced by the beams. Likewise, the apparatus may simply obtain an image when beam convergence is obtained.

In an effort to save processing time embodiments may utilize only three horizontal lines in the center of the field (fiducial spot carrying area). Since only a limited accuracy of range to the target is required (as determined by the optical string depth of field) it is only necessary to measure the width of the area covered with the spots. In order to increase sensitivity it is possible to subtract the field taken with the beams off from the field with the beams on. The result may be integrated so as to distinguish weak contrast beam spots (this condition occurs whenever ambient lighting is bright [the use of high intensity orange LED's in a pulse mode is desired so as to maximize instantaneous contrast]). In order to facilitate operator visibility a long current pulse to the LED's may be employed whenever the DSP is not obtaining an image.

In an exemplary embodiment a pair of LEDs may serve two purposes, namely operator aiming and focusing. Preferably, and as disclosed by FIGS. 9A–9H and 10, the apparatus simply takes an image when the array is at the correct distance from the optically readable information. In this way an operator may simply aim the apparatus at the information to be read at the approximate in focus distance from the information. In operation the operator simply points the LED spots at the information to be read and moves the apparatus away from or closer to the information and the apparatus obtains an image as soon as the two LED spots converge.

E. Description of FIGS. 9A–9H

FIGS. 9A through 9G comprise an electrical schematic which collectively illustrate an exemplary single array embodiment of the electrical components of a present invention.

FIG. 9A illustrates the timing generator (U3) provides timing and control signals to the driver (U1) which in turn controls a two-dimensional array via U2. External shutter control and operation is facilitated via U4A and U4B and supporting circuitry. The timing generator (U3) is also capable of independently providing shutter timing signals to the array (20 ms to 0.1 ms). However, the external shutter in an exemplary embodiment is capable of shutter speeds down to 2.0 μs. This configuration allows continuous selection of an exact exposure setting rather than a forced closest setting.

FIG. 9B is a continuation of the electrical schematic partially illustrated by FIG. 9A illustrating the computer processing unit (CPU; U8) and related components. U8 is operates a 32 MHZ device operating at the array frequency of 28.3 MHZ. The core logic (U10) for the CPU is an address decoder coupled with a latch (U9) and the address bus driver (U12 and U13). The reset circuit, memory logic, and buffers are also illustrated. An exemplary driver circuit for a display is also shown.

FIG. 9C is a continuation of the electrical schematic partially illustrated by FIGS. 9A and 9B. FIG. 9C illustrates a 32 bit-wide FFT static random access memory (FFT-SRAM; U15–U22). The FFT-SRAM provides a 64 bit by 32 bit memory which acts as a continuous bank transparent random access memory for the CPU (U8). Associated FFT-SRAM logic and buffer components are also illustrated.

FIG. 9D is a continuation of the electrical schematic partially illustrated by FIG. 9A–9C. FIG. 9D illustrates an exemplary FLASH EPROM system (U24–U25) providing for software updates while allowing for the access speed of conventional SPAMs. Also illustrated are voltage control for programming the FLASH EPROMs (see also, FIG. 9H).

FIG. 9E is a continuation of the electrical schematic partially illustrated by FIGS. 9A–9D. FIG. 9E illustrates the frame SRAM which stores frame images (one of the two array fields). The same field is taken each time rather than a random field. U26–U33 are the memory chips. Since the processor has a 32 bit data bus and the image has an 8 bit resolution the memory is organized as a single 256 kilobyte by 8 bit memory. When the CPU (U8) is reading this memory the memory provides the 8 lower bits and the data bus buffers (U35–U36) provide the upper 24 bits (all O's). Also illustrated are the associated buffers and logic. The address decoder (U34) allows sequential enablement of each RAM chip (U26–U33) so as to reduce energy consumption.

FIG. 9F is a continuation of the electrical schematic partially illustrated by FIGS. 9A–9E. FIG. 9F illustrates the imager having an 8 bit A/D converter (U43). U43 is provided two reference voltages by U40 and U41 and their respective latches. U42 is a buffer and amplifier. The array sampler (U44) is also illustrated. FIGS. 9G and 9H generally illustrate the power supplies.

G. Description of FIG. 10

Figure 10:
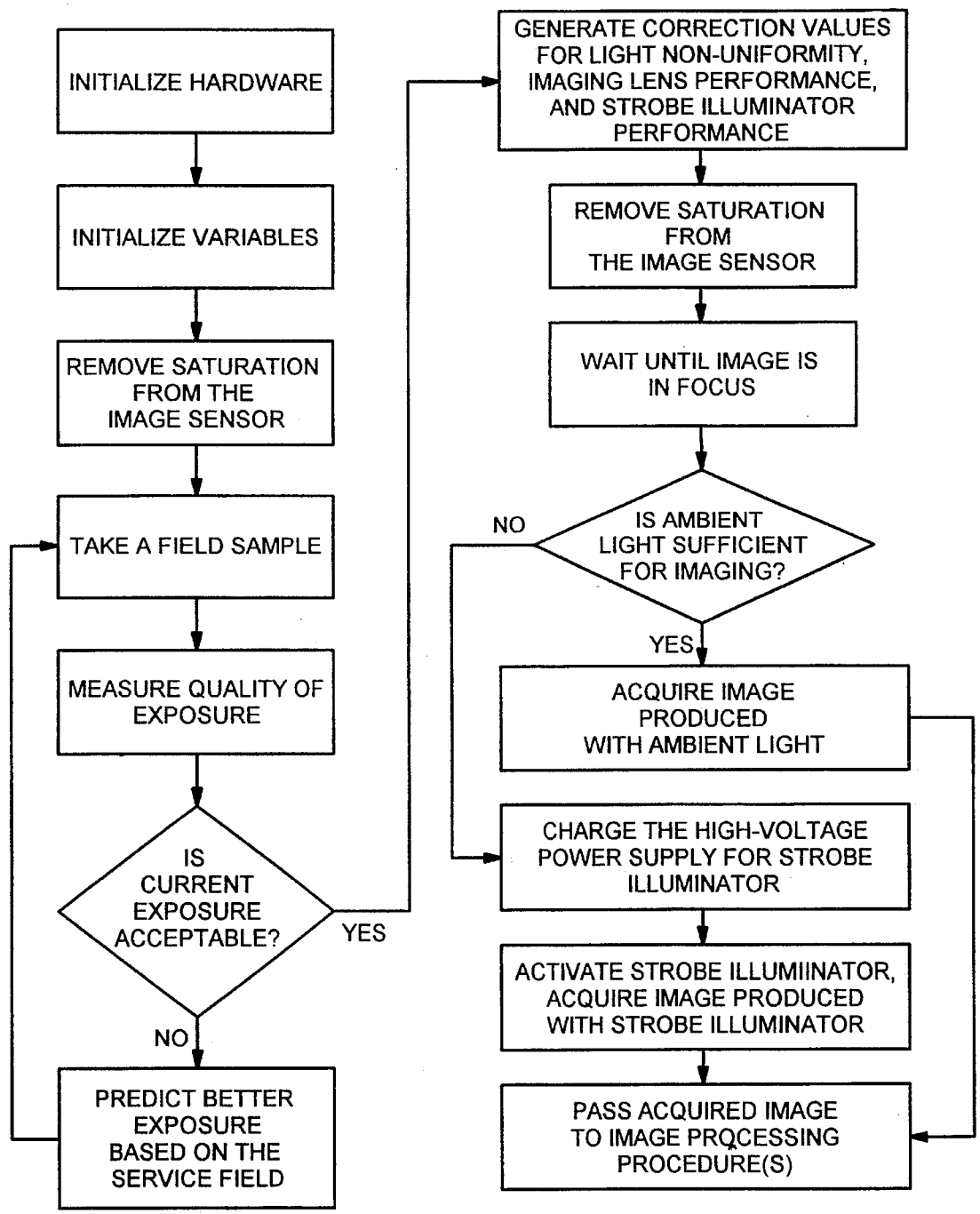
FIG. 10 is a flow diagram illustrating an exemplary program structure for operating the embodiment of FIG. 9A through 9H.

FIG. 10 is a flow chart illustrating the program logic obtaining an image for a preferred embodiment of the present invention. The logical steps of an exemplary control software utilized to perform the processes of a single array embodiment of the present invention. In operation the array, whether a conventional charged coupled array or a CMOS device, first consists of a hardware initialization step wherein the array is purged of any accumulated random charge and variables are set to zero. The Initialization step may begin upon activation of the apparatus through either operator intervention via a keyboard key, voice, or the like, or via code detection means (such as disclosed in U.S. Ser. No. 08/277,132), or the like.

A sample field (service field) is taken and the quality of the exposure is determined against a set of preset factors. In the case of reading optically readable information sets these factors may include a set of predefined conditions which if present are likely to lead to a successful read, i.e., decoding. Where decodability of an image to be taken is not an issue the prospect of successful analysis of a prospective image to be recorded may be determined via a set of other user controllable predefined conditions.

For example, it may be seen exposure control is a primary factor, thus, exposure quality may be determined against such a set of standards. If a threshold exposure level is not determined exactly, the apparatus will attempt another field sample at, for example, another exposure setting. Such step may utilize a fuzzy logic or other artificial intelligence means to determine the next most likely setting.

If the sample field meets the selected standards then, for example, a set of correction values may be generated for, for example, light non-uniformity, and imaging lens and/or artificial illumination source performance, or the like. The array is then purged and the apparatus is ready to determine whether another selected condition exists. For example, focus quality. In an exemplary embodiment focus is determined via the position of a spot or spots produced by a light emitting diode (LED), or the like, in the field of view of a second field sample.

G. Portable Data Terminal

Any embodiment of the present invention may be incorporated into a hand-held data terminal such as described in any of the following co-pending United States Patent Applications (said applications incorporated herein in their entirety by reference): (1) as the reader engine in the "Reader for Decoding Two Dimensional Optical Information" described in U.S. Ser. No. 07/919,488 filed on Jul. 27, 1992, U.S. Ser. No. 07/889,705 filed on May 26, 1992 (now abandoned), and U.S. Ser. No. 07/849,771 filed on Mar. 12, 1992 (issue fee paid Sep. 16, 1993); (2) as a reader engine in U.S. Ser. No. 07/305,302 filed Jan. 31, 1989, U.S. Ser. No. 07/345,200 filed Apr. 28, 1989, U.S. Ser. No. 07/347,602 filed May 3, 1989, U.S. Ser. No. 07/347,849 also filed on May 3, 1989, U.S. Ser. No. 07/426,135 filed Oct. 24, 1989, U.S. Ser. No. 07/558,895 filed on Jul. 25, 1990, U.S. Ser. No. 07/561,994 filed Jul. 31, 1990, U.S. Ser. No. 07/633,500 filed Dec. 26, 1990, U.S. Ser. No. 07/660,615 filed Feb. 25, 1991, U.S. Ser. No. 07/674,756 filed Mar. 25, 1991, U.S. Ser. No. 07/719,731 filed Jun. 24, 1991, U.S. Ser. No. 07/735,610 filed Jul. 23, 1991, U.S. Ser. No. 07/777,691 filed Oct. 10, 1991, and Ser. No. 07/960,520 filed on Oct. 13, 1992.

H. Description of FIG. 11

Figure 11:
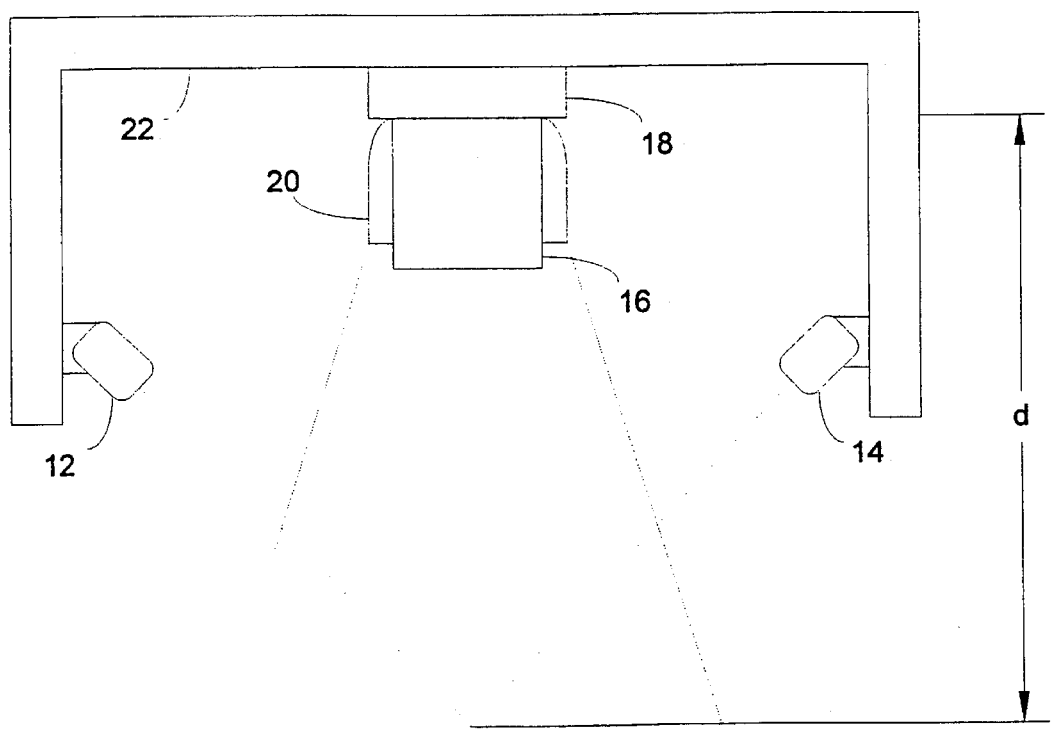
FIG. 11 is a side elevational view of an exemplary embodiment of a single sensor portable data file reader module adapted for use with a hand-held data terminal such as illustrated in FIGS. 13 and 14.
Figure 13:
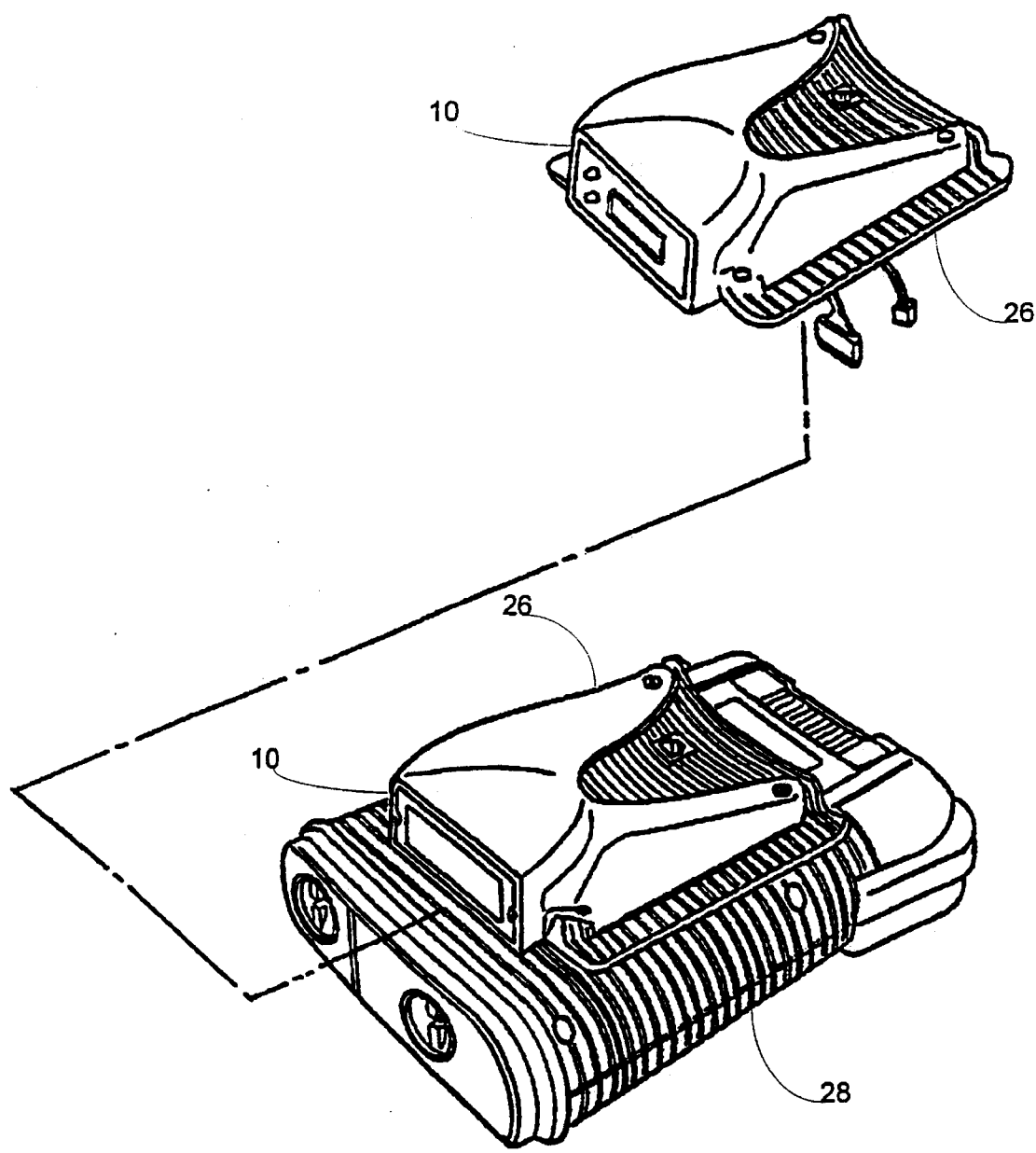
FIG. 13 is a perspective view of a hand-held data terminal illustrating an exemplary module embodiment of the present invention residing in a pod for attachment to a hand-held data terminal.
Figure 14A:
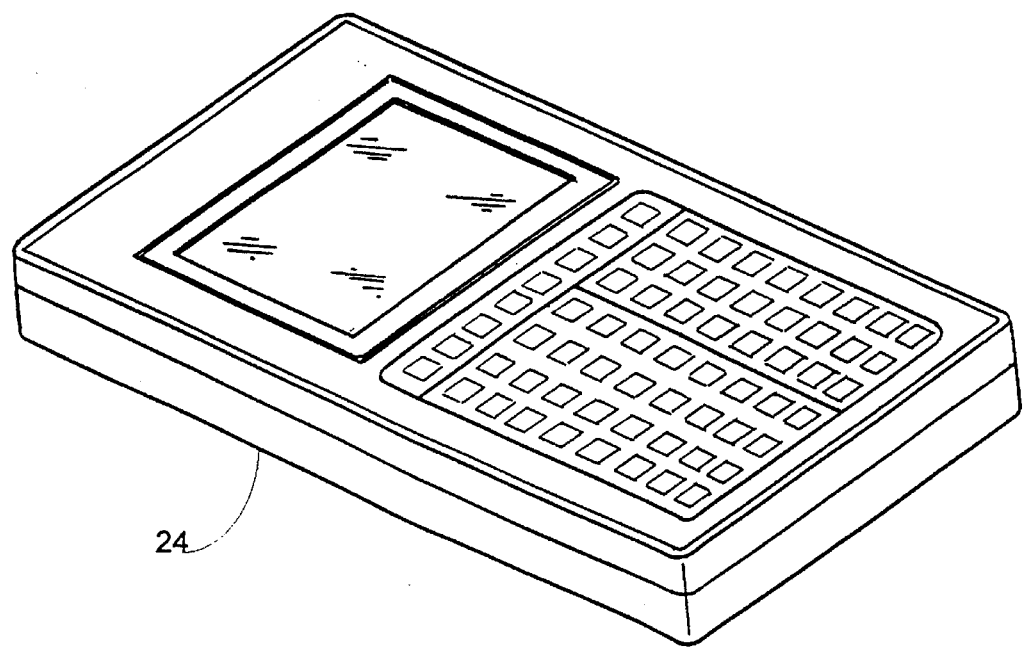
FIG. 14A is a top perspective view of a second hand-held data terminal containing an exemplary module embodiment of the present invention.
Figure 14B:
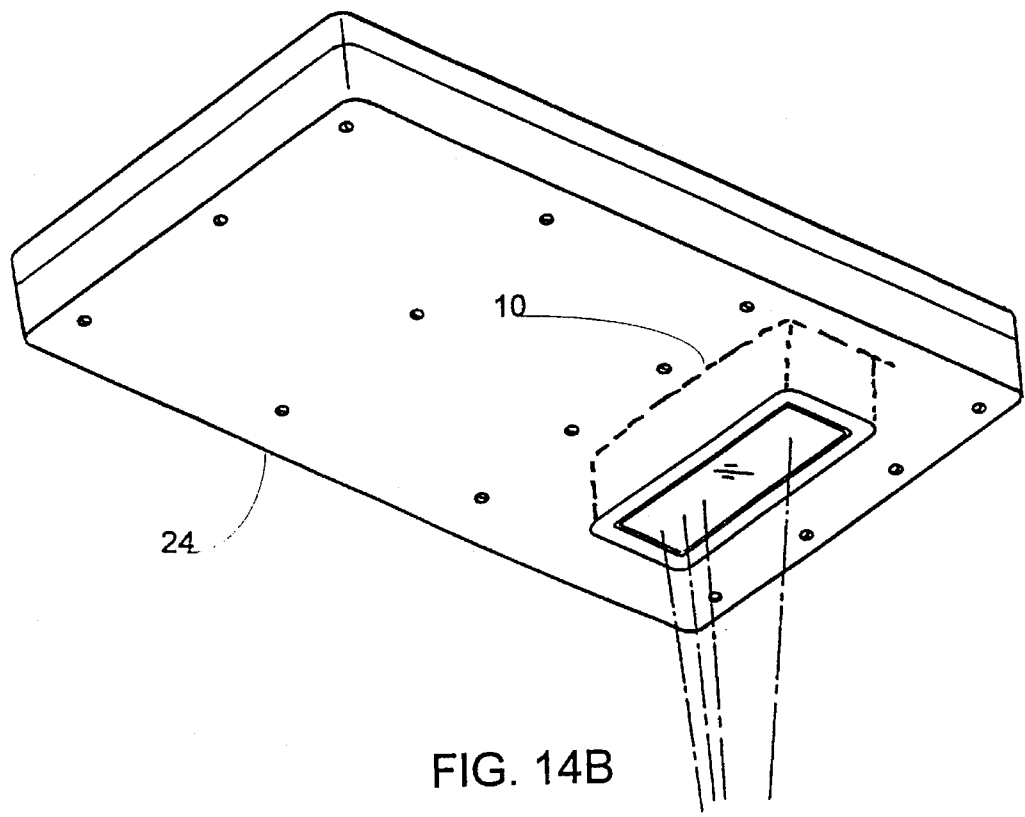
FIG. 14B is a bottom perspective view of the terminal of FIG. 14A.

FIG. 11 is a side elevational view of an exemplary embodiment of a single sensor portable data file reader module 10 adapted for use with a hand-held data terminal 24 and 28 such as illustrated in FIGS. 13 and 14–14B. A single two-dimensional photosensitive array 18 (e.g. a charge coupled device or CMOS array) is affixed, preferably in a central position, to a rectangular or similarly shaped recessed housing 22 which provides a rigid structure to which the components of the data file reader module 10 are secured. The housing 22 extends at its ends perpendicularly to the plane of that portion of the housing 22 to which the photosensitive array 18 is affixed.

A left LED 12 is mounted on one such housing 22 extension and a right LED 14 is mounted on the other housing 22 extension. The pair of LEDs 12 and 14 are mounted in such a manner that the center lines of the beams of emitted light converge at the apex of the angle formed by the two said center lines, such apex lying on a line normal to the plane formed by the photosensitive array 18, and such normal line intersecting said plane of the photosensitive array 18, preferably at the center of said array.

The distance, d, from the photosensitive array 18 at which the beams of light emitted from the LEDs 12 and 14 converge corresponds to the focal distance of a fixed focus lens 16, said lens 16 mounted on the photosensitive array 18. In an exemplary embodiment of the invention, the fixed focus lens 16 has a focal distance of 8.5 inches and an aperture such that the depth of field of 4.0 inches. The depth of field of the lens 16 allows for images within a range of 8.5±2.0 inches (6.5 inches to 10.5 inches) to be in focus. This range over which the image focus is maintained aids the human operator who may place the data file reader module 10 at imprecise distances from the data file to be read. So long as the data file reader module 10 is placed within the focus range, the image will be in focus.

In a further embodiment, the lens 18 may have a variable focal length such that long range or short range data file readings may be possible. In an additional further embodiment, the lens 18 may have a variable aperture such that the depth of field and the image brightness may be varied as well. Control of the focal length, depth of field, and image brightness may be processed and controlled by the DSP.

A xenon flash tube with back reflector 20 is mounted near the fixed focus lens 16 (the flash tube 20 is partially hidden by the lens 16 in FIG. 11). The xenon flash tube 20 provides supplemental lighting of the data file image to be read when the ambient light conditions are insufficient for proper image exposure. The back reflector of the xenon flash tube 20 provides concentration of the supplemental light on the data file image area and further prevents direct light incident on the photosensitive array 18. The use of the xenon flash tube 20 is controlled by the DSP.

I. Description of FIG. 12

Figure 12:
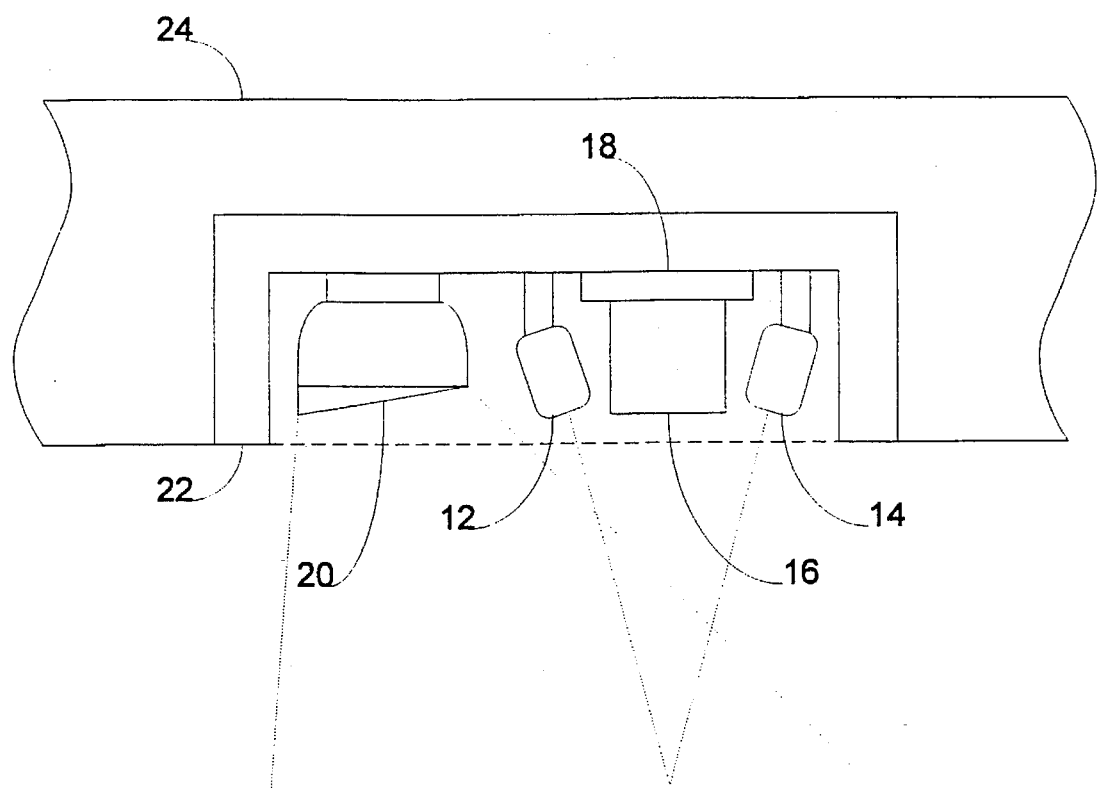
FIG. 12 is an elevation view of a second exemplary embodiment of a single sensor portable data file reader module adapted for use with a hand-held data terminal such as illustrated in FIGS. 13 and 14A–14B.

FIG. 12 depicts a second exemplary embodiment of the data file reader module 10 adapted for use with a hand-held data terminal 24 and 28 such as illustrated in FIGS. 13 and 14A–14B. In this embodiment, implemented in data terminal 24, the photosensitive array 18, lens 16, and LEDs 12 and 14 are mounted to the rectangular or similarly shaped recessed housing 22 at one end of the housing 22, and the xenon flash tube with back reflector 20 or the like is mounted at the other end of the housing 22 An advantage of this embodiment is the allowance of a larger xenon flash tube 20 capable of producing greater amounts of supplemental light.

J. Description of FIGS. 13 and 14A–14B

FIG. 13 is perspective view of a hand-held data terminal 28 illustrating an exemplary module embodiment of the present invention residing in an external pod 26 for attachment to a hand-held data terminal 28 The data file reader module 10 is frontally mounted within an external pod 26 such that the opening of the recessed housing 22 faces in a forward direction. With the module 10 thus mounted, the beams from the LEDs 12 and 14 are frontally emitted such that data files to be read are positioned directly in front of said data terminal, lying in a plane parallel to the front edge of said data terminal 28 and parallel to the plane of the photosensitive array 18.

FIG. 14A is a top perspective view of a second hand-held data terminal 24 containing an exemplary module embodiment of the present invention. Said data terminal 24 is designed to be used such that it is frequently laid upon a planar surface for input of data by means of a stylus or the like when not used for data file reading. Such conditions of use require said data terminal 24 to remain stable during stylus implemented data input and to remain flush with the surface upon which said data terminal 24 is laid. As required, said data terminal 24 may readily be employed for data file reading purposes.

FIG. 14B is a bottom perspective view of the terminal 24 of FIG. 14A. The data file reader module 10 is mounted directly within the hand-held data terminal so that said module 10 is flush or nearly so with the bottom surface of said terminal 24. Said module is mounted such that the beams form the LEDs 12 and 14 are downwardly emitted such that the data files to be read are positioned directly beneath said data terminal 24, lying in a plane essentially parallel with the bottom surface of said data terminal 24 and essentially parallel with the plane of the photosensitive array 18.

I claim:

1. A process for receiving an image of an object, comprising:
   (a) aiming one or more beams of photons at the object;
   (b) capturing an image of the object for preprocessing;
   (c) determining whether the object is within focal range;
   (d) focusing the image upon two or more photosensitive arrays, wherein the step of focusing involves adjusting two or more lenses such that a partial image of the object is focused on each array, wherein the partial images overlap each other;
   (e) indicating whether the object is within focal range;
   (f) controlling the exposure of the object;
   (g) triggering the capture of the image;
   (h) capturing a partial image by each of the arrays;
   (i) digitizing said captured partial images; and
   (j) processing said captured partial images.

2. The process according to claim 1, wherein the method for aiming one or more beams of photons includes utilizing one or more light emitting diodes such that said beams produce corresponding images on the plane of partial images.

3. The process according to claim 1, wherein the method for determining whether the object is within focal range includes obtaining the images produced by said aiming beams and detecting convergence of said aiming beams such that the object is within focal range upon convergence of said aiming beams.

4. The process according to claim 1, wherein the method for determining whether the object is within focal range includes obtaining the images produced by said aiming beams and analyzing the shape of the fiducial marks produced by said aiming beams whereby the overlap of the image produced by said aiming beams correlates to the displacement of the object from focal range.

5. The process according to claim 1, wherein the method for determining whether the object is within focal range includes obtaining the images produced by said aiming beams and detecting the distance of separation of the images produced by said aiming beams such that the distance of separation of the images produced by said aiming beams correlates to the displacement of tile object from focal range.

6. The process according to claim 1, wherein the method for determining whether the object is within focal range includes obtaining the images produced by said aiming beams and varying the power of one or more of said aiming beams for determining which image is produced by which said beams for further determining the direction of the displacement of the object from focal range.

7. The process according to claim 1, wherein the method for determining whether the object is within focal range includes obtaining the image produced by said beams and turning off one or more of said beams for determining which image is produced by which of said beams for further determining the direction of the displacement of the object from focal range.

8. The process according to claim 1, wherein the method of adjusting two or more lenses involves moving the lenses so that the distance between the lenses decreases as the lenses move away from the arrays.

9. The process according to claim 1, wherein the partial image overlap remains a substantially constant percentage of the total image.

10. The process according to claim 1, wherein the method for controlling the exposure of the object including preprocessing comprises:
   (a) obtaining an image at a first exposure for preprocessing;
   (b) processing said image by analyzing the illumination from the abient light conditions;
   (c) determining whether auxiliary illumination of the object is required whereby an image of the object may be obtained at a second exposure;
   (d) obtaining a subsequent image at a third exposure for further preprocessing; and
   (e) determining whether said exposure is sufficient or whether obtaining an image at subsequent exposures is necessary until sufficient exposure is obtained.

11. The process according to claim 1, wherein the triggering of the capture of the object occurs upon a determination by preprocessing that the object is within focal range.

12. The process according to claim 1, wherein the triggering of the capture of the object occurs upon convergence of said aiming beams.

13. The process according to claim 1, wherein the triggering of the capture of the image occurs upon overlap of the images produced by said aiming beams whereby said overlap correlates to a displacement of the object within focal range.

14. The process according to claim 1, wherein the capturing of a partial image includes focusing the partial image on a photosensitive array such that photons incident upon the array are converted to electrical charges whereby such electrical charges produce analog voltage signals corresponding to the partial image.

15. The process according to claim 1, wherein the capturing of a partial image includes utilizing the storage capability of a photosensitive array so that said photosensitive array implements an analog memory storage device.

16. The process according to claim 1, wherein the digitizing of said captured partial images includes converting said captured partial images to a discrete-time digital signal using an analog-to-digital converter.

17. The process according to claim 1, wherein the processing of said captured partial images includes processing said partial images using a digital signal processor.

18. A portable reader of images from objects, comprising:
(a) a frame having a window;
(b) at least two photosensitive arrays mounted within said frame and behind said window, said array for converting images into corresponding electrical signals;
(c) at least a adjustable two optical strings between said frame window and said arrays for focusing a partial image of an object onto each array; wherein the partial images overlap each other;
(d) at least two electromagnetic beam generators mounted on said frame such that the beams of said generators cross near the point of best focus of said optical strings; and
(e) computer means for processing said electrical signals from said arrays.

19. The reader of claim 18 further comprising aiming means for determining the position of an object relative to the focal range.

20. The reader of claim 18 further comprising capturing means for obtaining an image of an object for preprocessing whereby focusing and exposure control may be achieved.

21. The reader of claim 18 further comprising means for determining whether an object is within focal range.

22. The reader of claim 18 further comprising focusing means for capturing a focused image of an object.

23. The reader of claim 18 further comprising exposure control means for adjusting the sensitivity of the arrays to varying ambient light conditions.

24. The reader of claim 18 further comprising triggering means for initiating the capture of an image of an object.

25. The reader of claim 18 further comprising image capturing means for obtaining an electrical representation of an image of an object.

26. The reader of claim 18 further comprising analog to digital signal conversion means for obtaining a digital discrete-time representation of an image of an object.

27. The reader of claim 18 further comprising signal control means for electronic processing and manipulation of an image of an object.

28. The reader of claim 18 further comprising electronic memory means for temporary storage of an image of an object.

29. A portable reader of images from objects, comprising:
(a) a first two-dimensional sensor array and a second two-dimensional sensor array;
(b) a first optical lens and a second optical lens, said first optical lens moveable relative to the optical axis of said first sensor array, and said second optical lens moveable relative to the optical axis of said second sensor array;
(c) means for reciprocating said first and second optical lenses relative to their respective sensor arrays such that a partial image of an object can be focused on each array wherein the partial images overlap each other; and
(d) means for accurately positioning the portable image reader relative to an object to be read.

30. The reader of claim 29 further comprising aiming means for determining the position of an object relative to the focal range.

31. The reader of claim 29 further comprising capturing means for obtaining an image of an object for preprocessing whereby focusing and exposure control may be achieved.

32. The reader of claims 29 further comprising means for determining whether an object is within focal range.

33. The reader of claim 29 further comprising focusing means for capturing a focused image of an object.

34. The reader of claim 29 further comprising focusing indicating means for signaling that the object is within focal range.

35. The reader of claim 29 further comprising exposure control means for adjusting the sensitivity of the arrays to varying abient light conditions.

36. The reader of claim 29 further comprising triggering means for initiating the capture of an image of an object.

37. The reader of claim 29 further comprising image capturing means for obtaining an electrical representation of an image of an object.

38. The reader of claim 29 further comprising analog to digital signal conversion means for obtaining a digital discrete-time representation of an image of an object.

39. The reader of claim 29 further comprising signal control means for electronic processing and manipulation of and image of an object.

40. The reader of claim 29 further comprising electronic memory means for temporary storage of an image of an object.

41. A process for receiving an image of an object, comprising:
(a) aiming one or more beams of photons at the object;
(b) capturing an image of the object for preprocessing;
(c) determining whether the object is within focal range;
(d) focusing overlapping partial images of the object upon two or more photosensitive arrays each of said arrays having an optical axis of sight, wherein the step of focusing involves shifting the optical axes of sight depending upon the distance of the object from the arrays such that the overlap of the partial images remains a substantially constant percentage of the total image;
(e) indicating whether the object is within focal range;
(f) controlling the exposure of the object;
(g) triggering the capture of the image;
(h) capturing a partial image by each of the arrays;
(i) digitizing said captured partial images; and
(j) processing said captured partial images.

* * * * *

UNITED STATES PATENT AND TRADEMARK OFFICE
CERTIFICATE OF CORRECTION

PATENT NO.    : 5,591,955
DATED         : January 7, 1997
INVENTORS     : Vadim Laser It is certified that errors appear in the above-identified patent and that said Letters Patent is hereby corrected as shown below:

In col. 14, line 17, replace "tile" with -- the --

In col. 15, line 21, delete -- two adjustable --.

Signed and Sealed this

Thirteenth Day of May, 1997

*Attest:*

BRUCE LEHMAN

*Attesting Officer*   Commissioner of Patents and Trademarks